(12) United States Patent
Hsu et al.

(10) Patent No.: US 8,104,354 B2
(45) Date of Patent: Jan. 31, 2012

(54) CAPACITIVE SENSOR AND MANUFACTURING METHOD THEREOF

(75) Inventors: Yu Wen Hsu, Tainan (TW); Chao Ta Huang, Hsinchu (TW); Jing Yuan Lin, Tucheng (TW); Sheah Chen, Taipei (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 28 days.

(21) Appl. No.: 12/877,337

(22) Filed: Sep. 8, 2010

(65) Prior Publication Data

US 2011/0154905 A1  Jun. 30, 2011

(30) Foreign Application Priority Data

Dec. 25, 2009 (TW) ............................... 98144928 A

(51) Int. Cl.
*G01L 9/12* (2006.01)
*H01L 21/302* (2006.01)
(52) U.S. Cl. .............. 73/718; 73/724; 438/53; 29/592.1
(58) Field of Classification Search .................. None
See application file for complete search history.

(56) References Cited

U.S. PATENT DOCUMENTS

| | | | | |
|---|---|---|---|---|
| 4,523,474 A | * | 6/1985 | Browne et al. | 73/724 |
| 4,617,606 A | * | 10/1986 | Shak et al. | 361/283.4 |
| 5,442,962 A | * | 8/1995 | Lee | 73/718 |
| 5,663,505 A | * | 9/1997 | Nakamura | 73/702 |
| 5,942,692 A | * | 8/1999 | Haase et al. | 73/724 |
| 6,535,460 B2 | | 3/2003 | Loeppert et al. | |
| 6,568,274 B1 | * | 5/2003 | Lucas et al. | 73/718 |
| 6,788,795 B2 | | 9/2004 | Scheeper et al. | |
| 7,362,873 B2 | | 4/2008 | Pedersen | |
| 2004/0237658 A1 | * | 12/2004 | Ohms et al. | 73/718 |
| 2005/0076719 A1 | * | 4/2005 | Jakobsen et al. | 73/718 |
| 2007/0056377 A1 | * | 3/2007 | Matsubara | 73/718 |
| 2009/0266172 A1 | * | 10/2009 | Casey et al. | 73/724 |

* cited by examiner

*Primary Examiner* — Andre Allen
(74) *Attorney, Agent, or Firm* — Egbert Law Offices PLLC

(57) ABSTRACT

A capacitive sensor includes a substrate, at least one first electrode, at least one second electrode, a sensing device, at least one anchor base, at least one movable frame, and a plurality of spring members. The first and second electrodes are disposed on the substrate, and the anchor base surrounds the first and second electrodes and is disposed on the substrate. The movable frame surrounds the sensing device. Some of the spring members connect the movable frame and the sensing device, and the other spring members connect the movable frame and the anchor base. The sensing device and the first electrode are both sensing electrodes. The movable frame is disposed above the second electrode, and cooperates with the second electrode to act as a capacitive driver.

24 Claims, 25 Drawing Sheets

CAPACITIVE SENSOR AND MANUFACTURING METHOD THEREOF

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present disclosure relates to a capacitive sensor and a manufacturing method thereof, and more specifically, a miniature capacitive sensor device and manufacturing method thereof.

2. Description of Related Art Including Information Disclosed Under 37 CFR 1.97 and 37 CFR 1.98

Most current capacitive sensors have fine capacitive structures formed on wafer substrates using the microelectromechanical systems (MEMS) technique, and have wide applications to many technical fields such as microphones, pressure gauges, accelerometer, oscillators, and RF switches.

The acoustic transducer, produced by a MEMS capacitive microphone chip which are integrated through silicon micromachining technique and semiconductor processing technique, has the advantages of low weight, small volume, and good signal quality. As the request for sound quality of consumer electronic products such as telephone handsets has expanded increasingly and the markets for hearing aids have started to flourish as well, MEMS capacitive microphone chip has gradually become an important type of microphone chip.

Presently, the application of MEMS microphone chip is limited to a few types of MEMS microphone, because very few manufacturers currently produce MEMS microphones, including Knowles Corp., Infineon Corp., and Sonion Corp. And most of the MEMS microphone package processes for mass production are developed by Knowles Corp.

A MEMS microphone structure designed by Knowles Corp. is shown in FIGS. 1 to 3. An acoustic transducer 10 includes a conductive membrane 12 and a perforated member 40, both of which are supported by a base 30 and separated by an air gap 20. An air gap 22, extremely thin, is present between the conductive membrane 12 and the base 30, to enable the membrane 12 to move up and down freely and decouple the membrane 12 from the base 30. A plurality of indentations 13 are formed beneath the membrane 12, for avoiding stiction between the membrane 12 and the base 30.

Support portion 41 may be constructed of a ring or of a number of bumps. If the support portion 41 is constructed of a ring, a sound-sealed space is formed when the membrane 12 rests against the support portion 41, and as a result, the acoustic transducer exhibits a well-controlled low frequency roll-off. A dielectric layer 31 is provided between the air gap 22 and the base 30. A conducting electrode 42 is fixed beneath the nonconductive member 40. The member 40 has several holes 21 for creating a passageway 14 for sound flow.

A sacrificial layer as an interposer is interposed between the conductive membrane and the conducting electrode of the acoustic transducer (capacitive microphone device) designed by Knowles Corporation. Thereafter, the sacrificial layer is removed to form an air gap therein by an etching process. However, stiction easily occurs between the conductive membrane and the conducting electrode and causes them to short after the sacrificial layer is removed by etching. Because the conductive membrane is formed on the sacrificial layer and then the sacrificial layer is removed, residual stresses accumulate in the conductive membrane. Therefore, the sensitivity of the conductive membrane is reduced.

Even though such an acoustic transducer can use a conductive membrane with a special design to release the residual stresses therein and increase the sensitivity of the conductive membrane, the stiction problems still occur in the manufacturing processes. To conquer such problems, the acoustic transducer can utilize specially designed springs to balance and counteract the stiction force through the rigidity of the springs. In FIG. 4, another microphone structure designed by Knowles Corp. is shown. This structure is essentially the same as that of FIGS. 1 to 3, except the membrane 12 is connected to the base 30 via several spring structures 11 in order to decrease the intrinsic stress of the diaphragm and the stress generated from the base 30 or from the packaged device. The stresses existing in the membrane can be reduced, but the stiction problem still occurs therein. Accordingly, the manufacturing yield is low.

In addition to acoustic transducers, other capacitive sensors including pressure gauges, accelerators, oscillators, and RF switches also require small capacitance clearance to satisfy the requirements of a low driving voltage and high sensitivity. In the MEMS processes, the distance between two capacitance electrodes is based on a deposition step and the thickness of the sacrificial layer. However, the distance between the two electrodes is very small, approximately 1 to 3 µm, so the stiction problem frequently occurs therein. Accordingly, the manufacturing yield is very low.

In view of the above problems, there is an urgent need for improvements in the manufacture of capacitive sensors that can resolve the aforesaid problems of stiction and sensitivity.

BRIEF SUMMARY OF THE INVENTION

The present disclosure discloses a capacitive sensor and a manufacturing method thereof. A moveable frame and a capacitance with very small electrode clearance are formed by bonding two substrates. Accordingly, the sensitivity of the capacitive sensor is improved and the problem of stiction between the two electrodes is also resolved.

According to an embodiment of the present disclosure, a capacitive sensor comprises a substrate, at least one first electrode, at least one second electrode, a sensing device, at least one anchor base, at least one movable frame, and a plurality of spring members. The first and second electrodes are disposed on the substrate, and the anchor base surrounds the first and second electrodes and is disposed on the substrate. The movable frame surrounds the sensing device. Some of the spring members connect the movable base and the sensing device, and the other spring members connect the movable frame and the anchor base.

According to an embodiment of the present disclosure, a method for manufacturing a capacitive sensor comprises the steps of: providing a first wafer-based substrate having a surface on which a base layer is disposed, wherein the first substrate includes an insulating layer and a silicon layer; etching the base layer to form a first cavity, a second cavity, and a third cavity sequentially; providing a second substrate on which a first electrode and a second electrode are disposed; bonding the unetched surface of the base layer to the second substrate; removing the first substrate; and etching the base layer to form a sensing device, at least one anchor base, at least one movable frame, and a plurality of spring members, wherein the anchor base surrounds the first and second electrodes and is disposed on the second substrate, the movable frame surrounds the sensing device, some of the spring members connect the movable frame and the sensing device, and the other spring members connect the movable frame and the anchor base.

The aforesaid descriptions schematically demonstrate the technical features of the present disclosure. In order to thoroughly understand the present disclosure, detailed descriptions of method steps and components are provided below. It should be noted that the implementations of the disclosure are not limited to the specific details that are familiar to persons in the art related to semiconductor manufacturing processes, and such details are omitted to avoid unnecessary limitations to the disclosure. On the other hand, components or method steps which are well known are not described in detail. A preferred embodiment is described in detail below. However, in addition to the preferred detailed description, other embodiments can be broadly employed, and the scope of the disclosure is not limited by any of the embodiments, but should be defined in accordance with the following claims and their equivalent.

DETAILED DESCRIPTION OF THE INVENTION

The embodiments will be explained with the appended drawings to clearly disclose the technical characteristics of the present disclosure.

Figure 1:
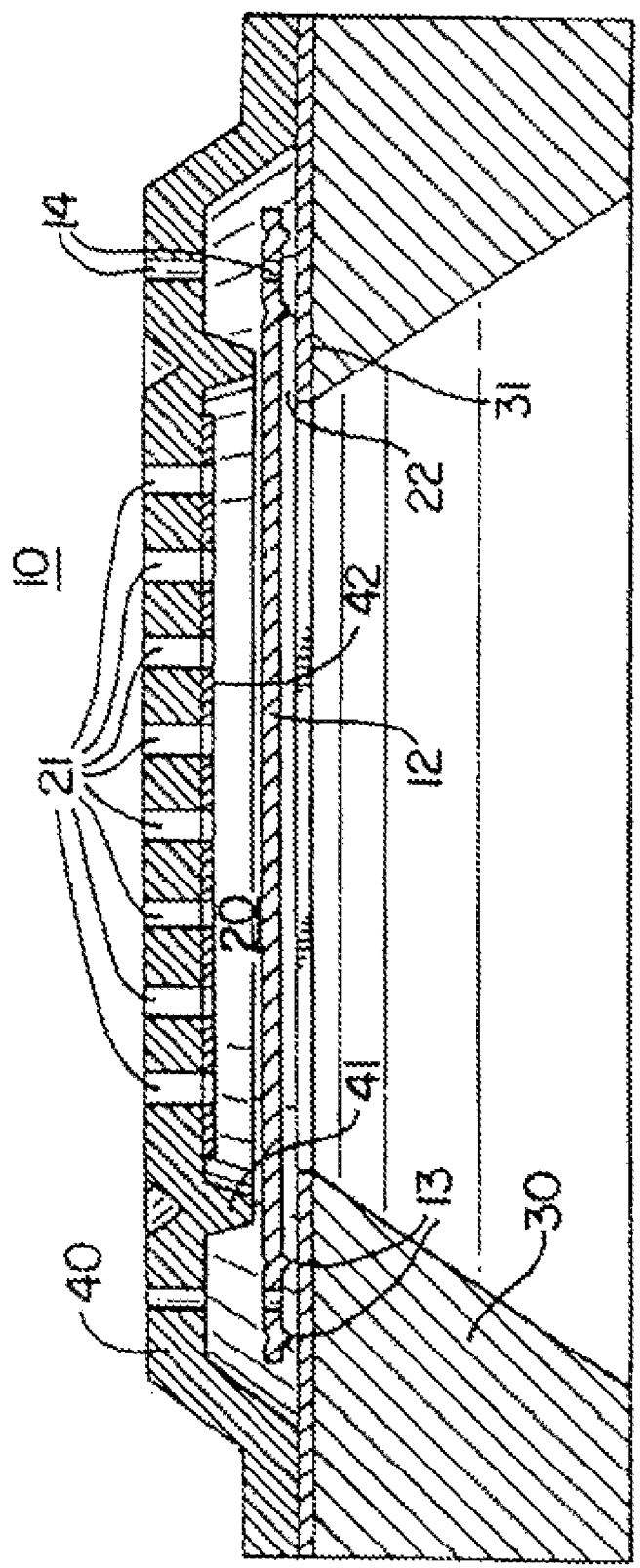
FIGS. 1 to 3 show cross-sectional, top view and perspective cross-sectional diagrams of an acoustic transducer designed by Knowles Corp.
Figure 2:
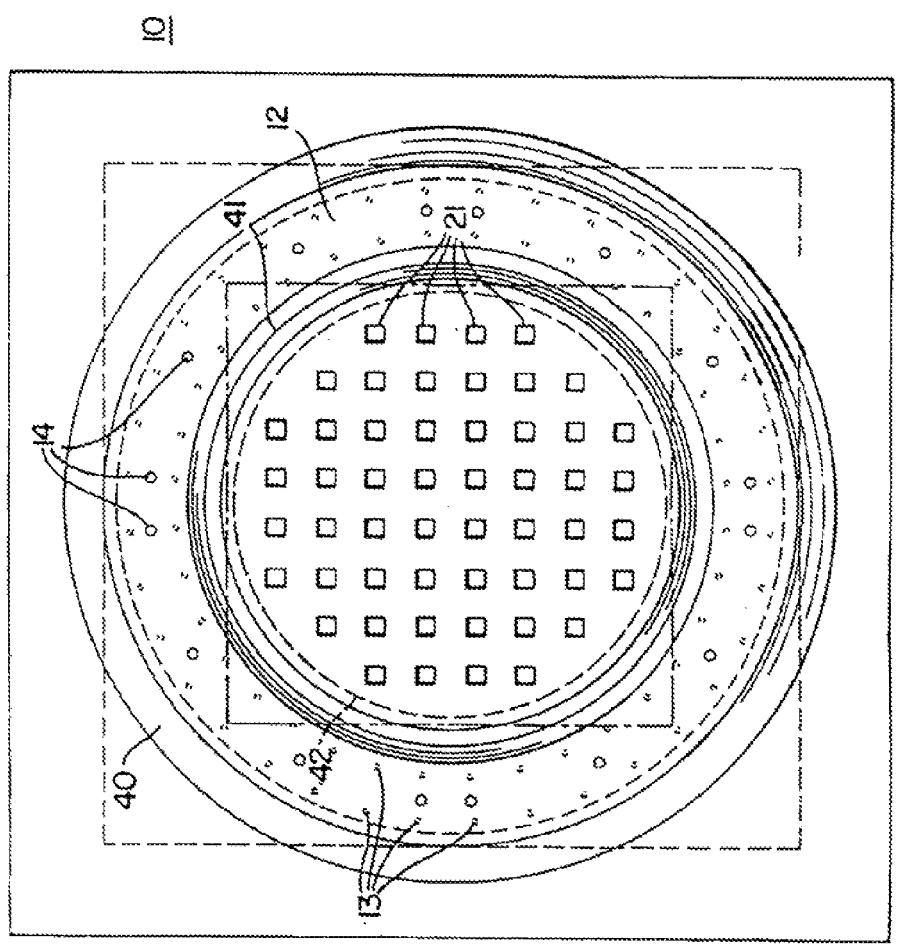
Figure 3:
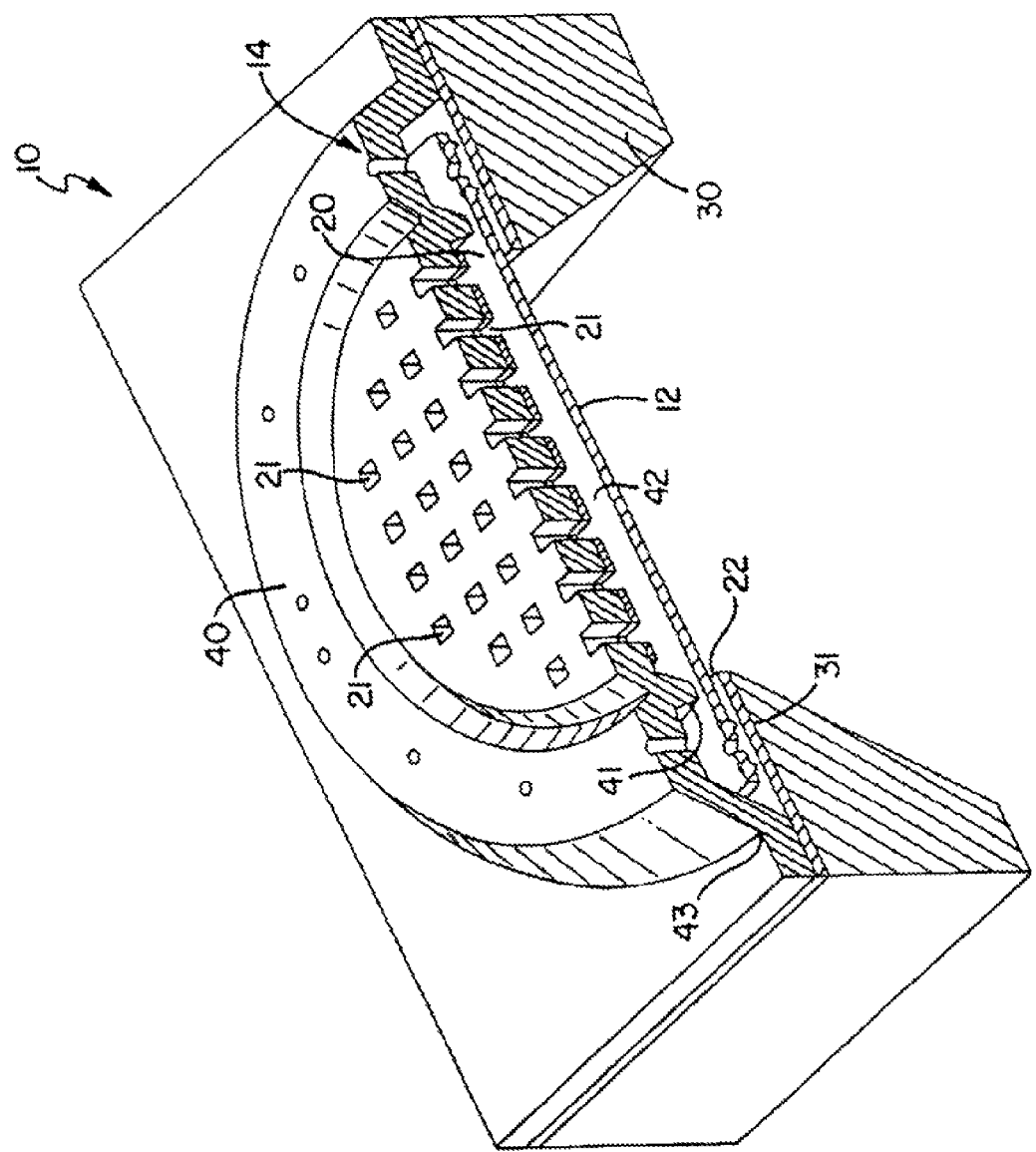
Figure 4:
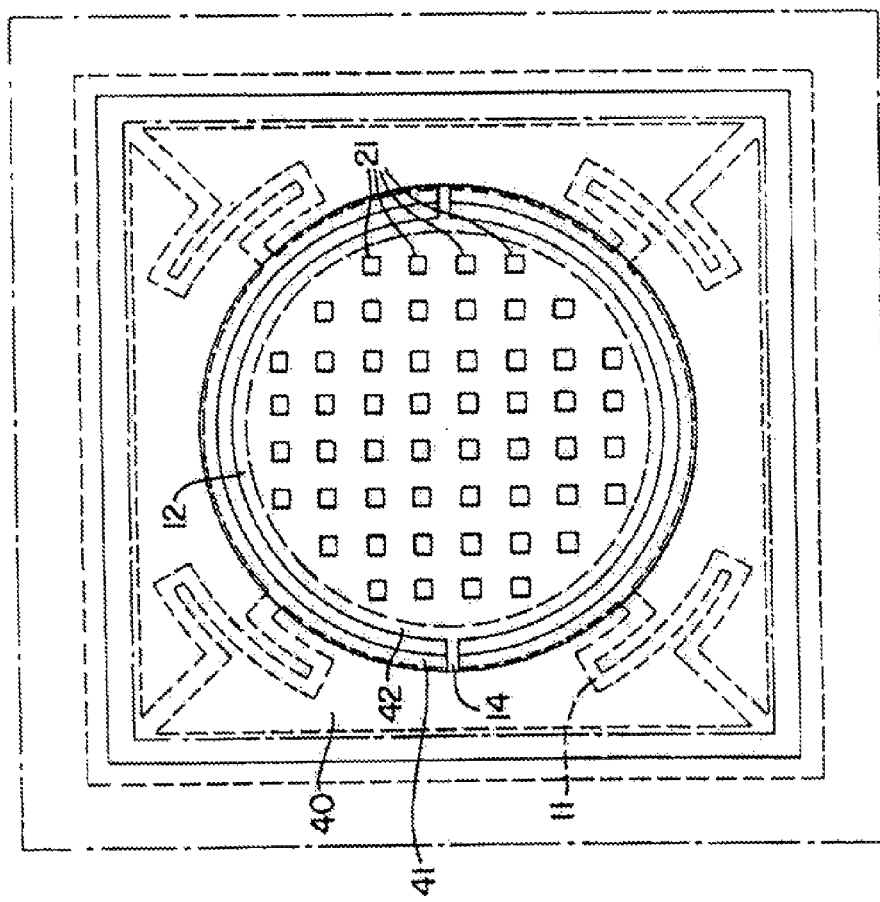
FIG. 4 shows a top view diagram of another acoustic transducer designed by Knowles Corp.
Figure 5A:
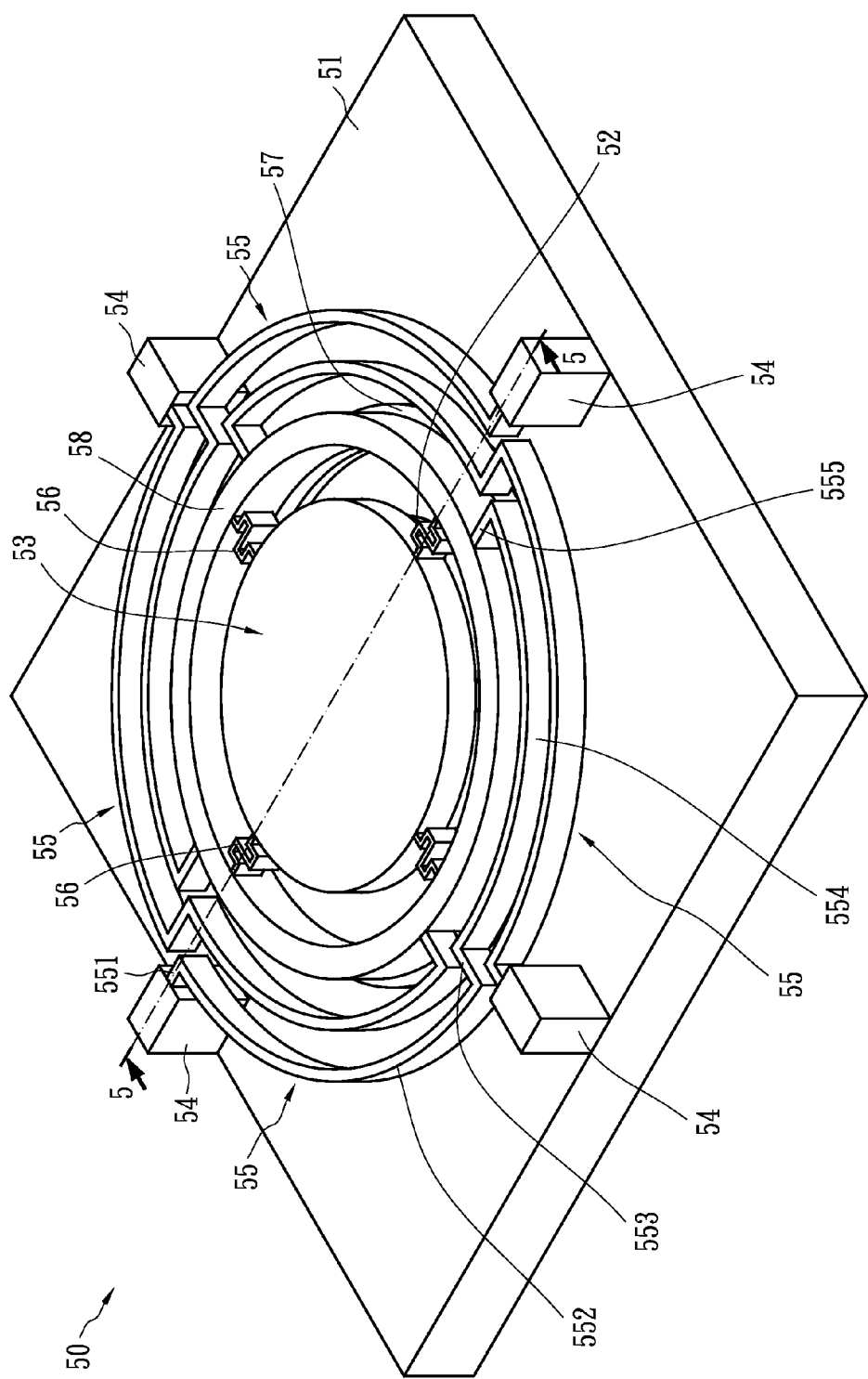
FIG. 5A shows a perspective diagram of a capacitive sensor in accordance with one embodiment of the present invention.
Figure 5B:
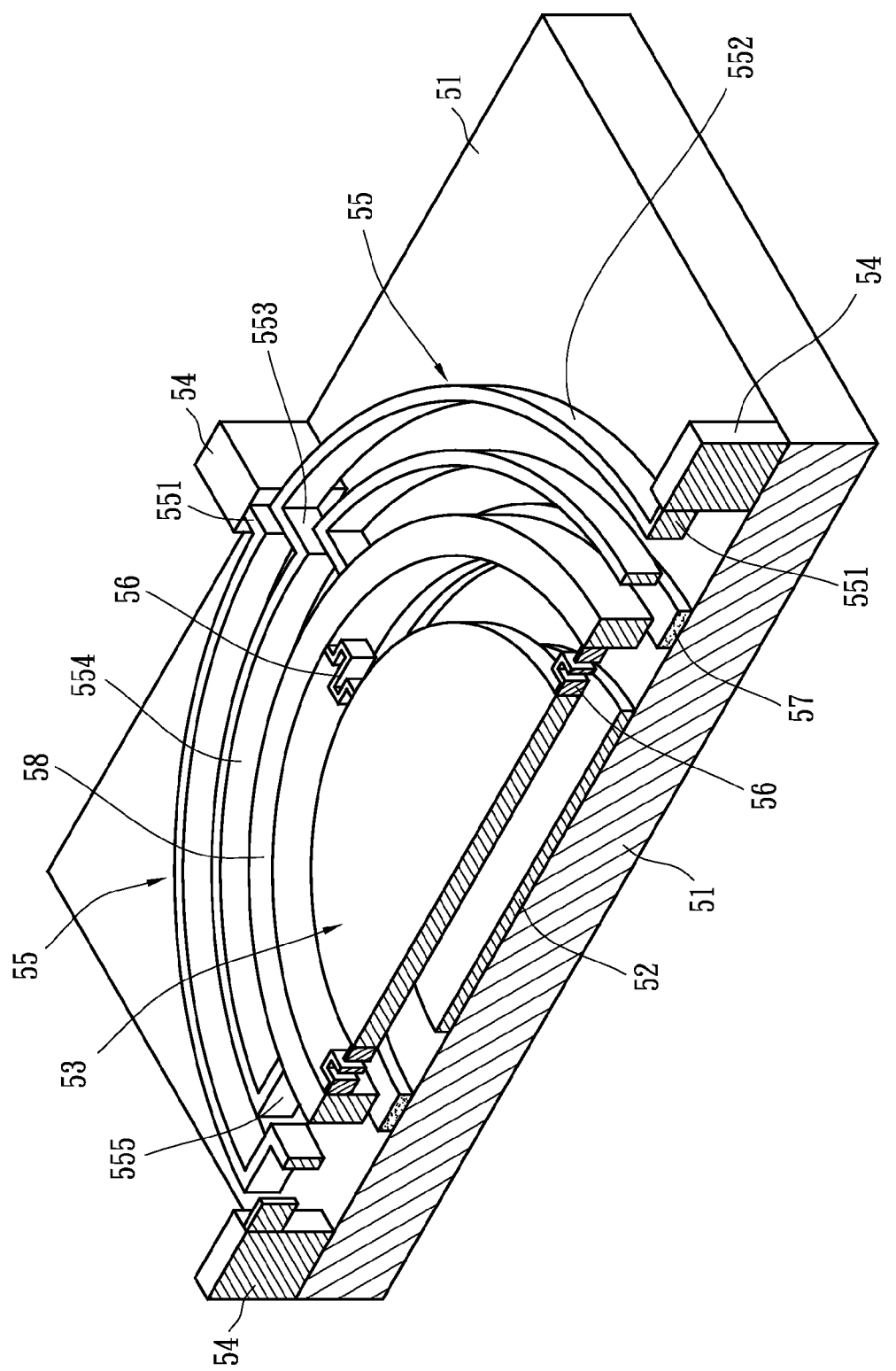
FIG. 5B shows a perspective cross-sectional diagram taken along line 5-5 in FIG. 5A.

FIG. 5A shows a perspective diagram of a capacitive sensor in accordance with one embodiment, and FIG. 5B shows a perspective cross-sectional diagram taken along line 5-5 in FIG. 5A. A capacitive sensor 50 comprises a substrate 51, a first electrode 52, a second electrode 57, a sensing device 53, a plurality of anchor bases 54, a movable frame 58, a plurality of first spring members 55, and a plurality of second spring members 56. The material of the substrate 51 is a silicon substrate or a glass substrate. The first electrode 52 and the second electrode 57 around the first electrode 52 are disposed on the substrate 51. The movable frame 58 is disposed above the second electrode 57, and when a bias voltage is applied, the second electrode 57 attracts the movable frame 58 to contact an insulating member (not shown) on the surface of the second electrode 57. The anchor bases 54 surround the first and second electrodes (52, 57), and are disposed on the substrate 51.

The movable frame 58 surrounds the sensing device 53. The thickness of the movable frame 58 is smaller than that of the anchor bases 54, but is greater than that of the sensing device 53. The second spring members 56 connect the movable frame 58 and the sensing device 53, and the first spring members 55 connect the movable frame 58 and the anchor bases 54. The sensing device 53 and the first electrode 52 are both sensing electrodes of a variable capacitor, and the movable frame 58 and the second electrode 57 form a capacitive driver. When the sensing device senses physical parameters such as acoustic waves, pressure, or acceleration, the capacitance of the sensing electrodes vary accordingly. In the embodiment, the anchor bases 54 are four units evenly spaced around a circle. However, the disclosure is not limited by such four-unit case, and the disclosure can also include three units evenly spaced around a circle, or include a plurality of units evenly spaced around a circle. Each of the first spring members 55 includes a first connecting segment 551, a first suspension segment 552, a transition segment 553, a second suspension segment 554 and a second connecting segment 555, and each of the first spring members 55 connects the lateral of the circular sensing device 53 and one of the anchor bases 54. The first suspension segment 552 and the second suspension segment 554 can be deemed as a cantilever beam with arc-length of 90 degrees (combining two arcs with different radiuses). However, the disclosure is not limited to 90-degree arcs, and the disclosure can also include a cantilever beam with an arc-length of 120 degrees, 72 degrees, or 60 degrees.

The flexible cantilever beam can give the sensing device 53 main force for returning to a level in an inactive state (that is, a maximum distance between the upper sensing device 53 and the lower first electrode 52), so the first spring members 55 can be deemed as vertical springs. Because the elastic coefficient of the first spring member 55 is small, the sensitivity of the sensing device 53 is not affected and reduced. One end of the first connecting segment 551 is connected to one of the anchor bases 54 and the second connecting segment 555 is connected to movable frame 58. The transition segment 553 extends from one end of the first suspension segment 552 to the second suspension segment 554 along a radial direction.

In an embodiment, the resilient force of the spring members restricts the distance between the sensing device and the first electrode at an inactive status to a maximum in order to prevent stiction between the two electrodes. Through sequentially applying bias voltage to the movable frame and the second electrode, a minimum distance is maintained between the sensing device and the first electrode at an active status. Accordingly, the sensitivity of the capacitive sensor is improved.

Figure 6A:
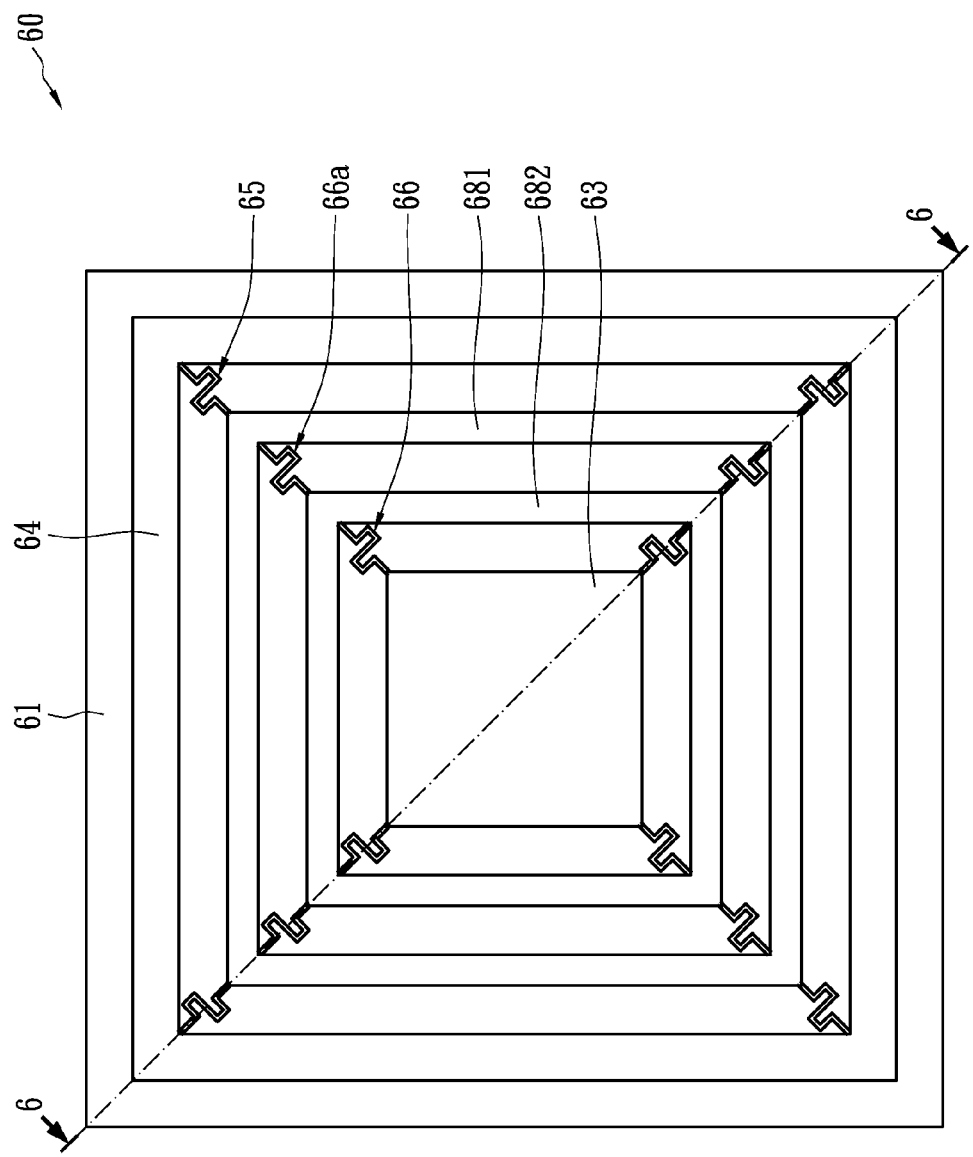
FIG. 6A shows a top view diagram of a capacitive sensor in accordance with one embodiment.
Figure 6B:
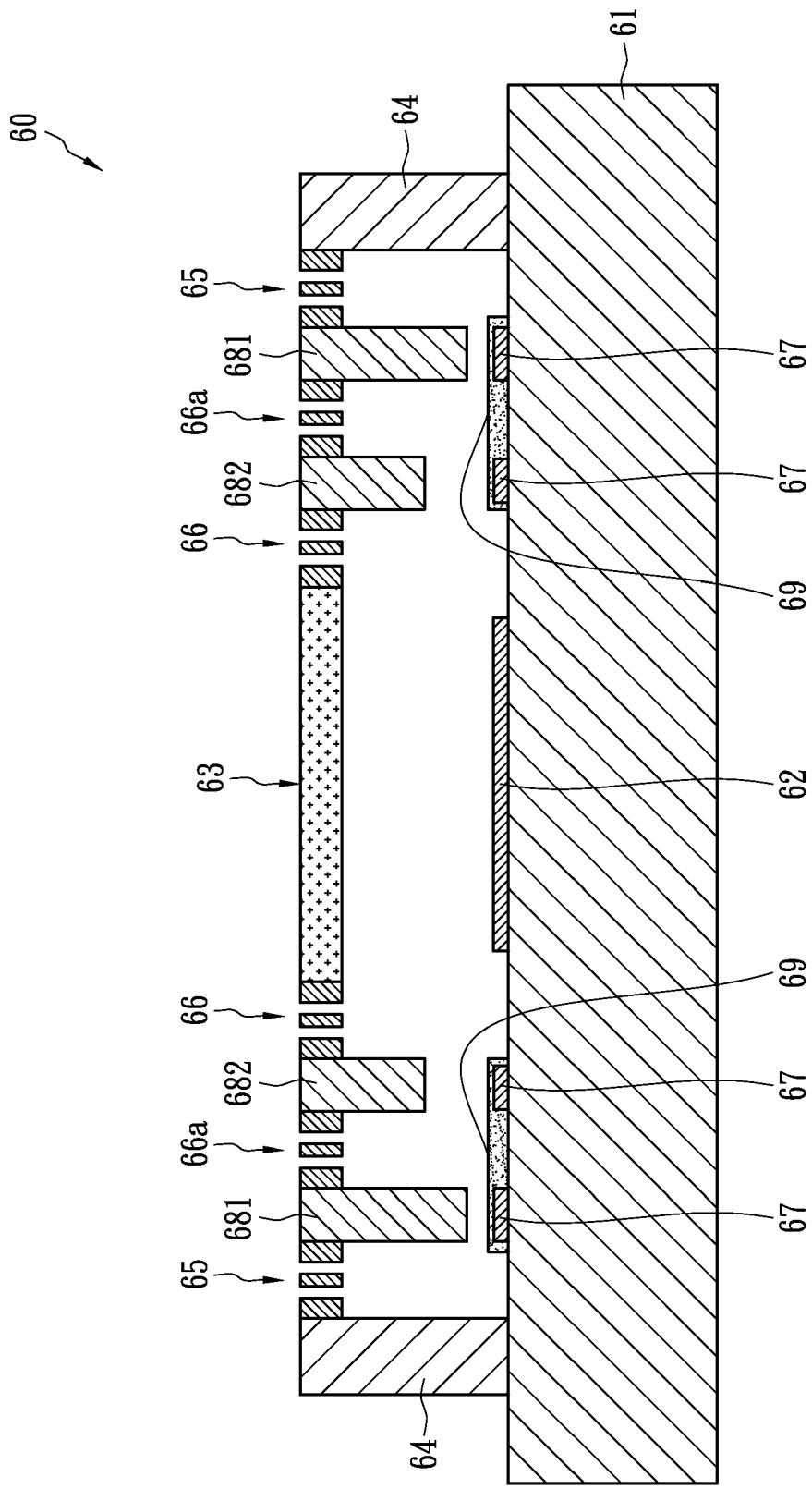
FIG. 6B shows a cross-sectional diagram taken along line 6-6 in FIG. 6A.

FIG. 6A shows a top view diagram of a capacitive sensor in accordance with one embodiment, and FIG. 6B shows a perspective cross-sectional diagram taken along line 6-6 in FIG. 6A. A capacitive sensor 60 comprises a substrate 61, a first electrode 62, a second electrode 67, a sensing device 63, an anchor base 64, a first movable frame 681, a second movable frame 682, a plurality of first spring members 65, a plurality of second spring members 66, and a plurality of third spring members 66a. In contrast to FIG. 5A, this embodiment includes an additional set of a movable base and a corresponding electrode, and the sensing device 63 is rectangular. Furthermore, the anchor base 64 and two movable frames 681, 682 are also rectangular rings. The disclosure is not limited by the exemplary shape, and any other shapes or forms are also included in the disclosure. The thickness of the first movable frame 681 adjacent to the anchor base 64 is greater than the thickness of the second movable frame 682 adjacent to the sensing device 63.

The sensing device 63 is disposed above the first electrode 62, and is connected to the second movable frame 682 through the second spring members 66. The first movable frame 681 and the second movable frame 682 are respectively disposed above one of the second electrodes 67, and are connected to each other through the third spring members 66a. The anchor base 64 and the first movable frame 681 are also connected to each other through the first spring members 65. Furthermore, the surfaces of the second electrodes 67 are covered with an insulating layer 69.

In addition, FIG. 6B also shows the cross-sectional diagram of the capacitive sensor 60 in an inactive state. When the sensing device 63 is in an inactive state, the first movable frame 681 and the second movable frame 682 are above one of the second electrodes 67. The anchor base 64 can also be bonded to the surface of the substrate 61 by a bonding layer (not shown). There is a maximum distance between the sensing device 63 and the first electrode 62 due to the force of the first spring members 65, the second spring members 66, and the third spring members 66a acting on the sensing device 63.

Figure 6C:
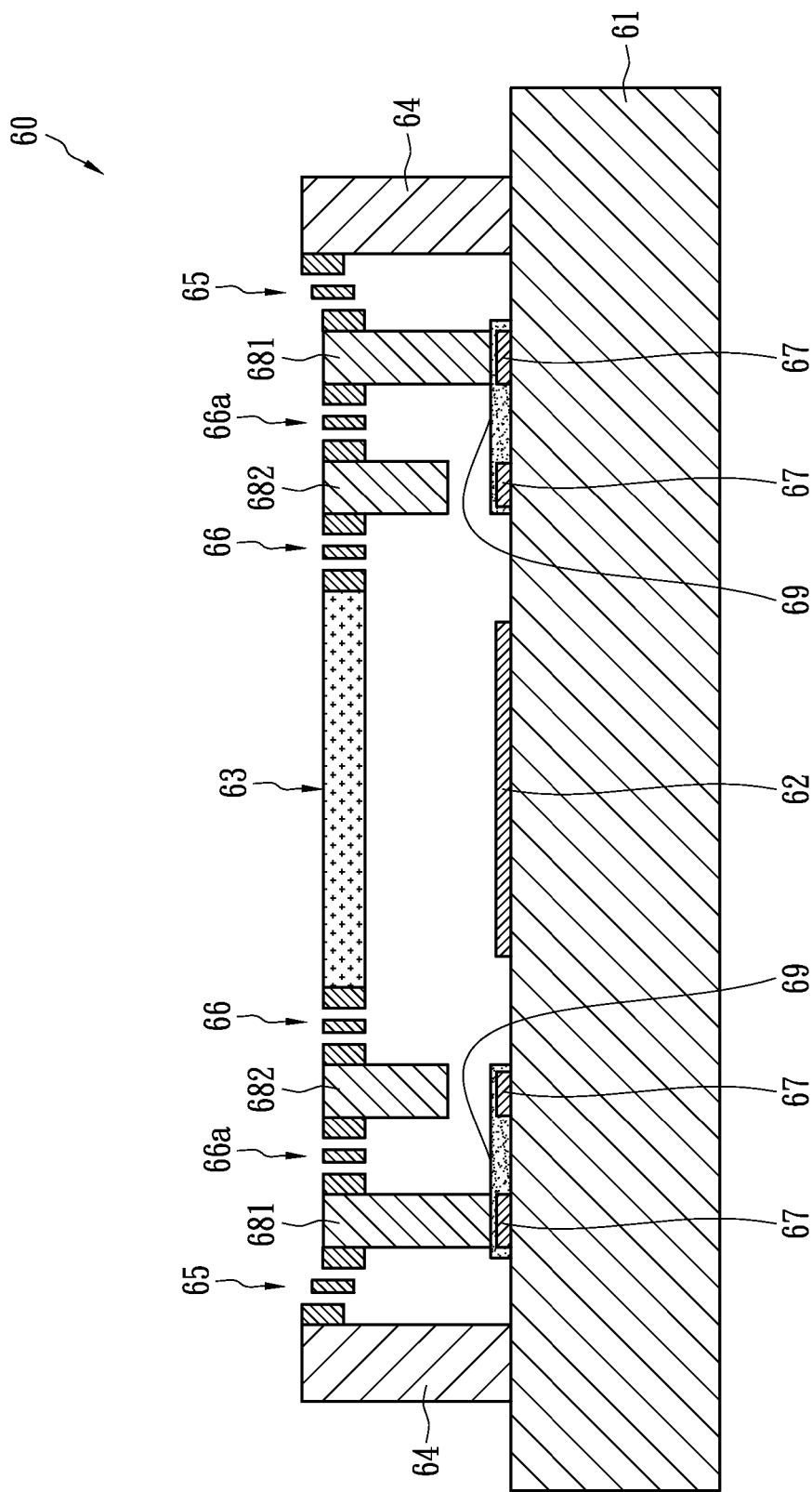
FIG. 6C shows a cross-sectional diagram of a capacitive sensor in an active state.
Figure 6D:
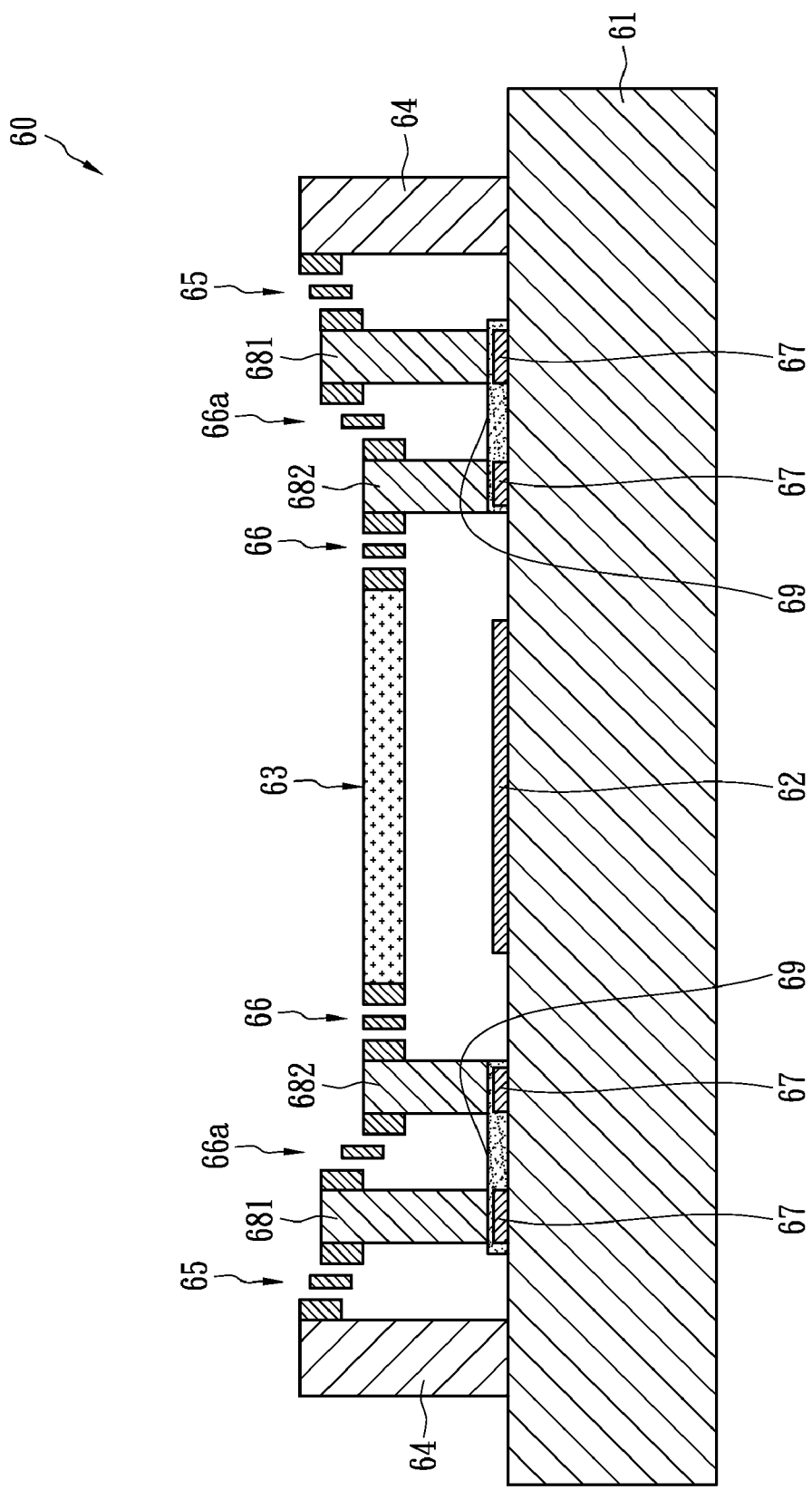
FIG. 6D shows a cross-sectional diagram of a capacitive sensor in an active state.

FIG. 6C shows a cross-sectional diagram of the capacitive sensor in an active state. In an active state, when a bias voltage is applied to the outer second electrode 67, the second electrode 67 attracts the first movable frame 681 to be immobilized on the insulating member 69. Thereafter, another bias voltage is further applied to the inner second electrode 67, and the second electrode 67 attracts the second movable frame 682 to be immobilized on the insulating member 69, as shown in FIG. 6D.

Figure 6E:
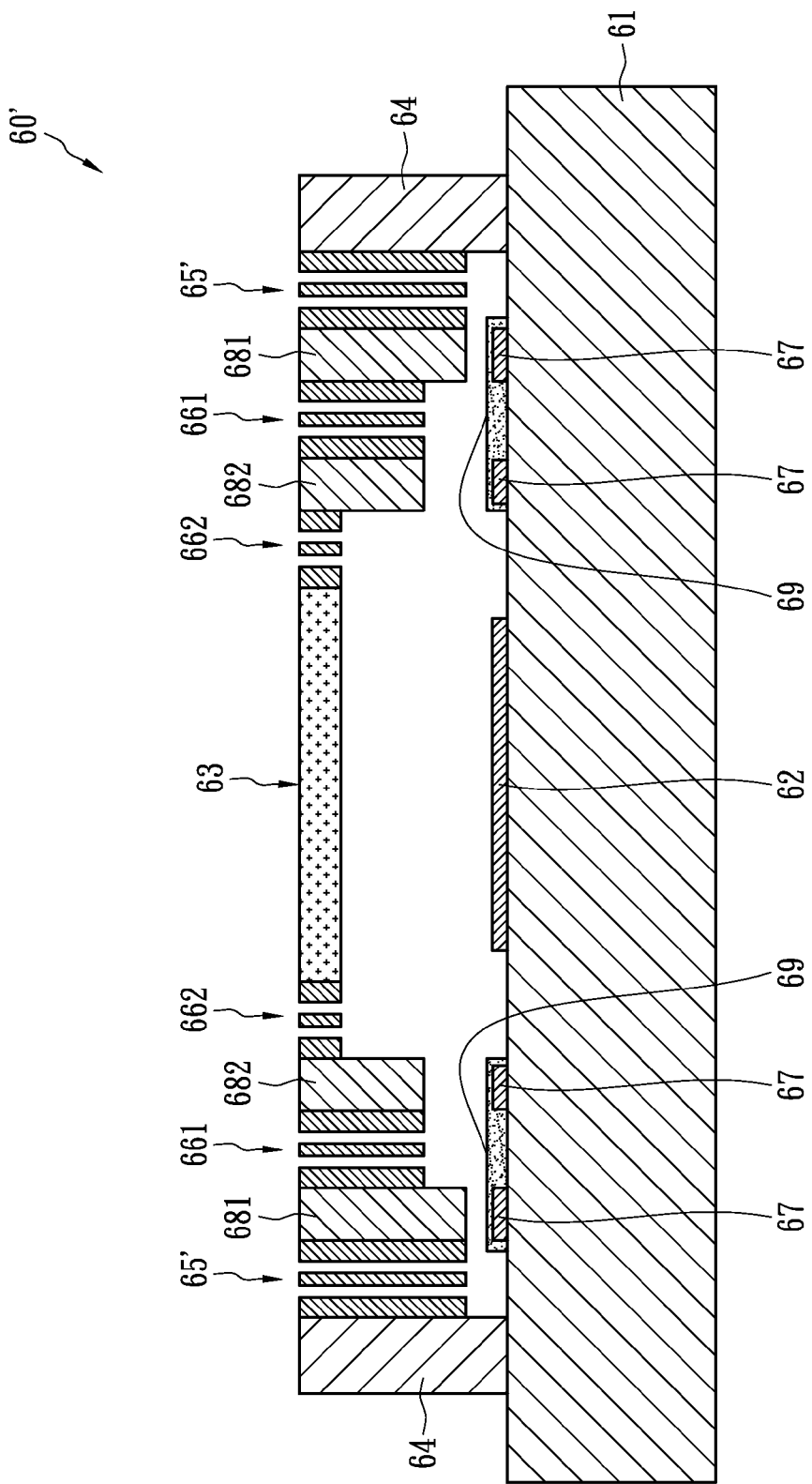
FIG. 6E shows a cross-sectional diagram of a capacitive sensor in accordance with another embodiment.

FIG. 6E shows a cross-sectional diagram of a capacitive sensor in accordance with another embodiment. In contrast to FIG. 6B, the thickness of first spring members 65' of the capacitive sensor 60' of the embodiment is equal to that of the first movable frame 681. The thickness of the second spring members 662 is equal to that of the sensing device 63 and the thickness of the third spring members 661 is equal to that of the second movable frame 682.

Figure 6F:
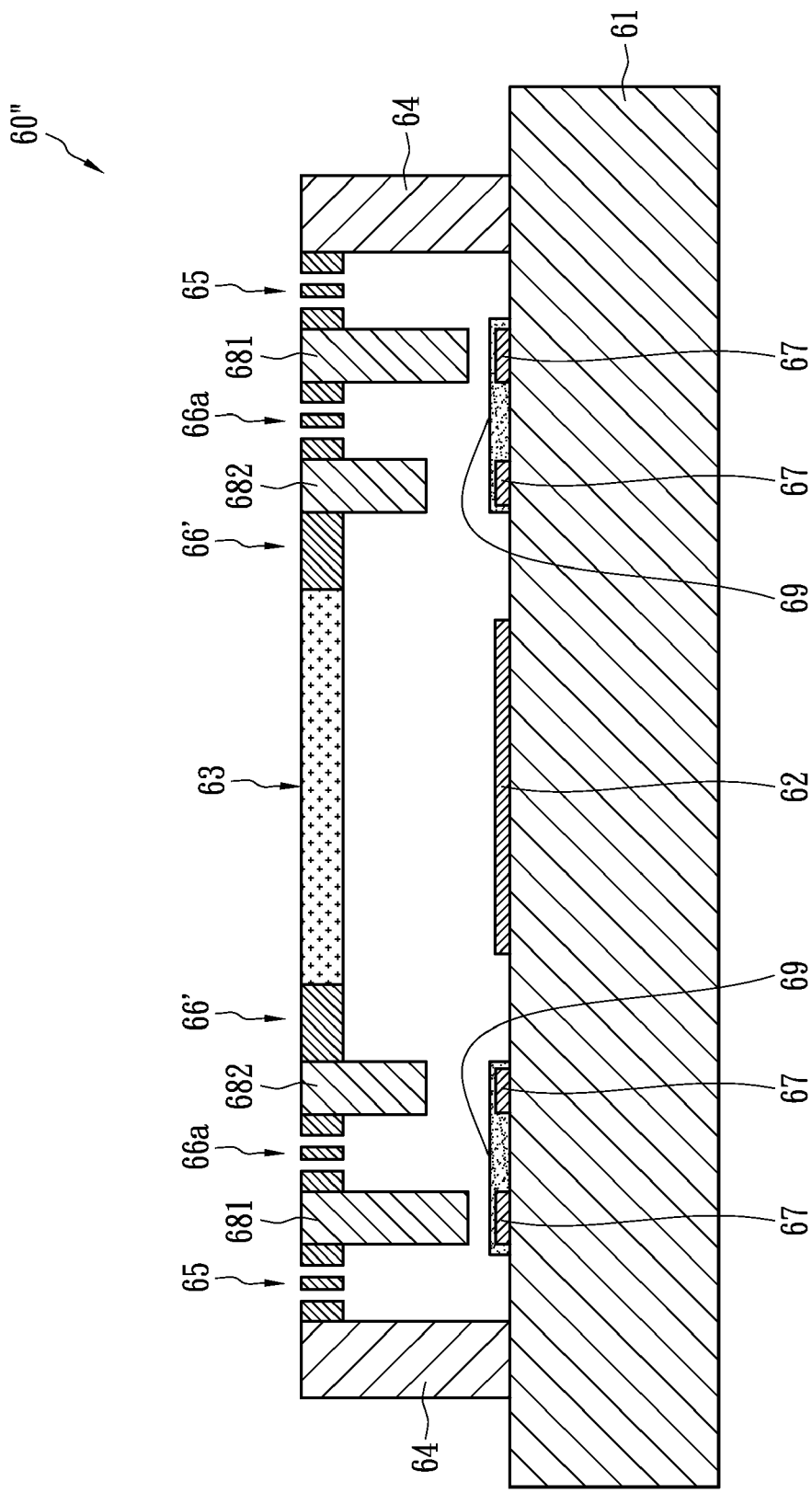
FIG. 6F shows a cross-sectional diagram of a capacitive sensor in accordance with another embodiment.

FIG. 6F shows a cross-sectional diagram of a capacitive sensor in accordance with another embodiment. In contrast to FIG. 6B, the inner second spring member 66' of the capacitive sensor 60" of the embodiment is a continuous elastomer such as a plate spring.

Figure 6G:
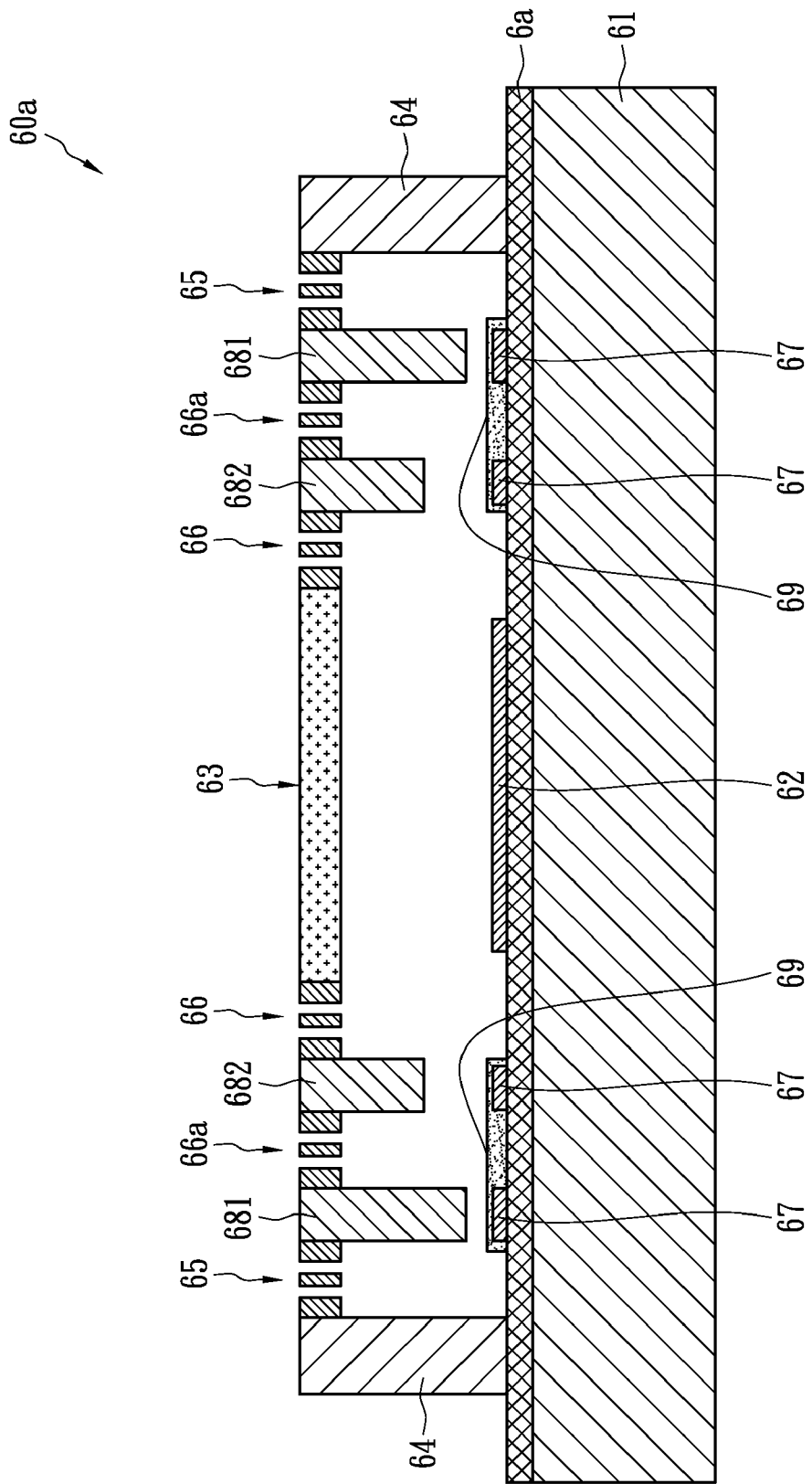
FIG. 6G shows a cross-sectional diagram of a capacitive sensor in accordance with another embodiment.

FIG. 6G shows a cross-sectional diagram of a capacitive sensor 60a in accordance with another embodiment. The substrate 61 is a silicon substrate. An insulating layer 6a is interposed between the upper surface of the substrate 61 and the lower surface of the electrodes 62, 67 to prevent an electrical connection between the electrodes 62, 67 and the substrate 61.

Figure 6H:
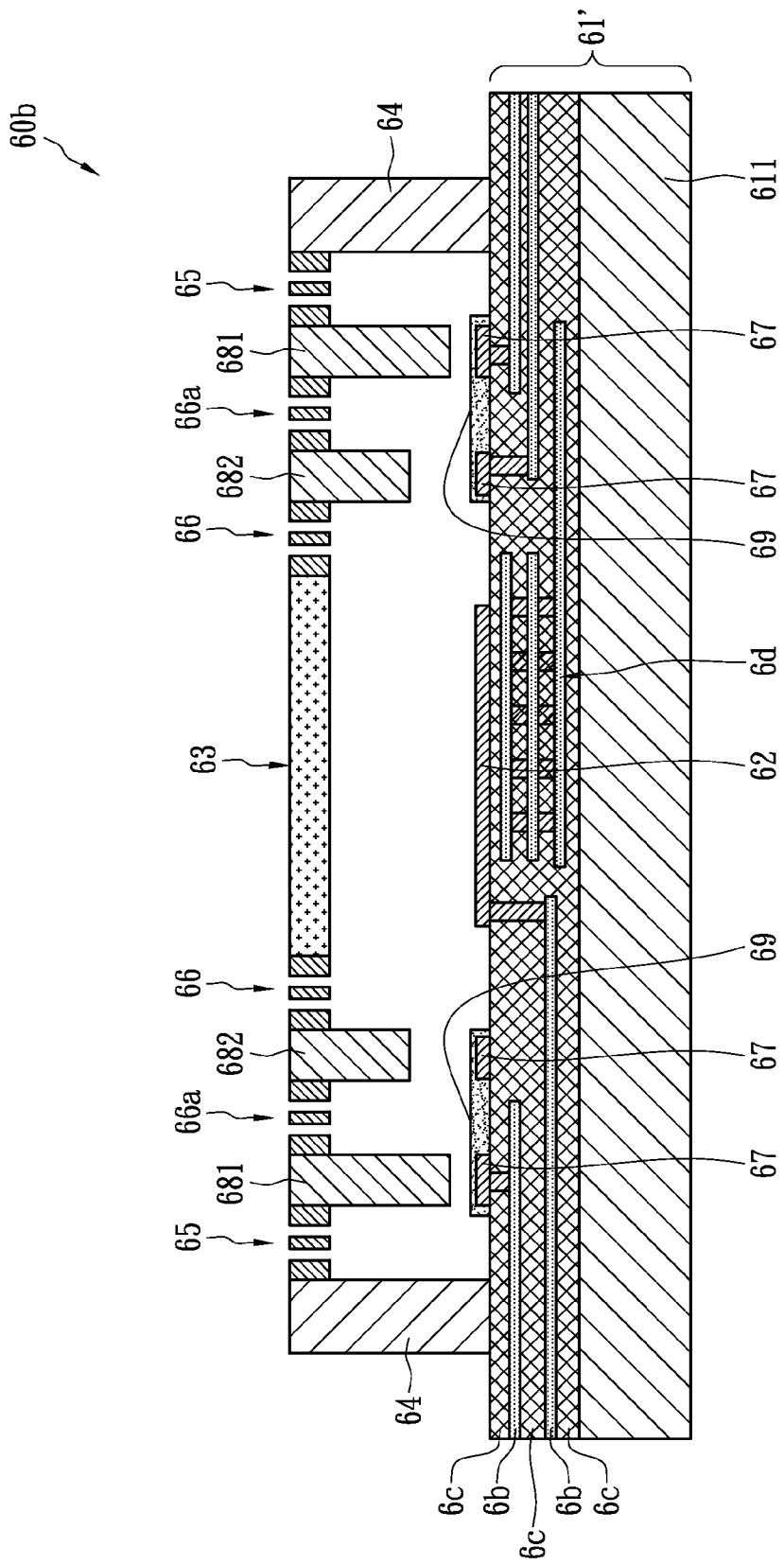
FIG. 6H shows a cross-sectional diagram of a capacitive sensor in accordance with another embodiment.

FIG. 6H shows a cross-sectional diagram of a capacitive sensor 60b in accordance with another embodiment. The substrate 61' comprises a silicon layer 611, a plurality of conductive layers 6b, a plurality of insulating layers 6c, and at least one circuit area 6d, such as a CMOS circuit.

Figure 7A:
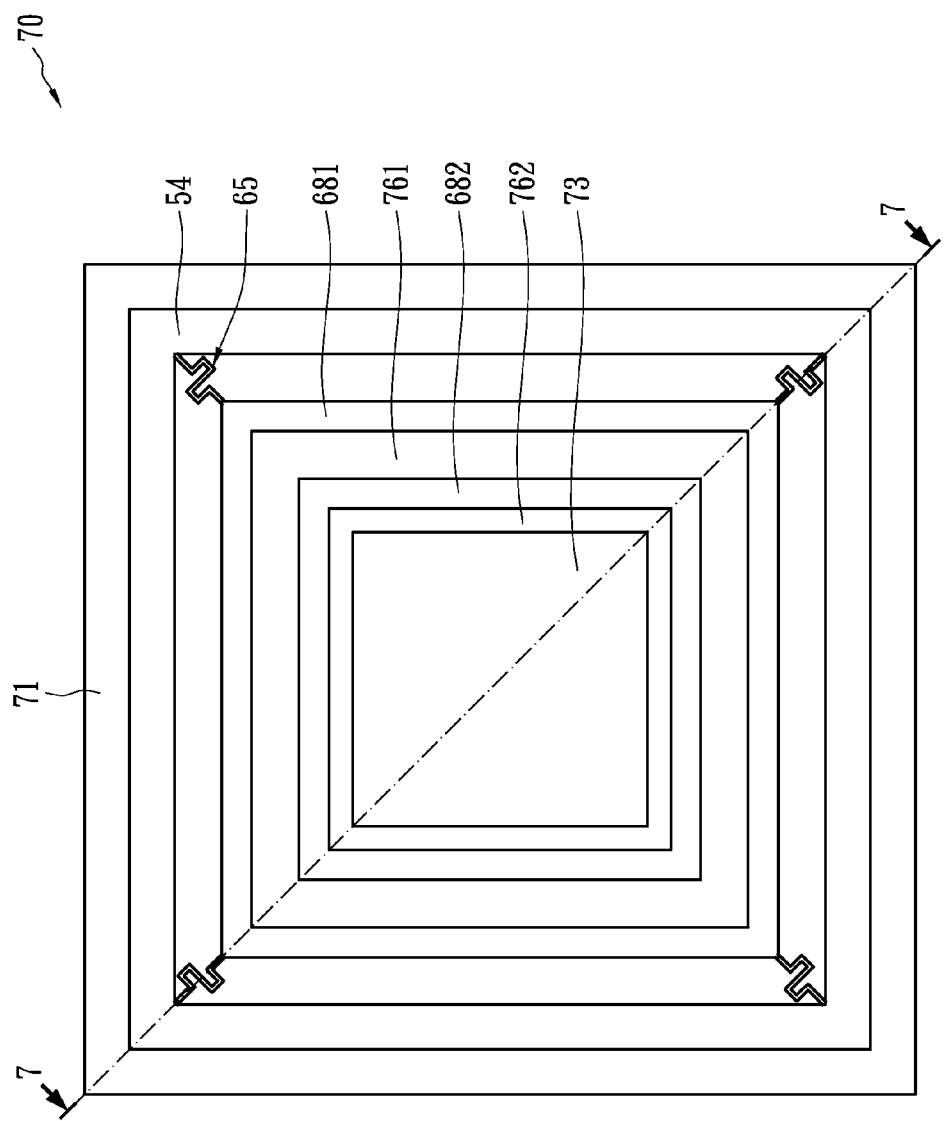
FIG. 7A shows a top view diagram of a capacitive sensor in accordance with another embodiment.
Figure 7B:
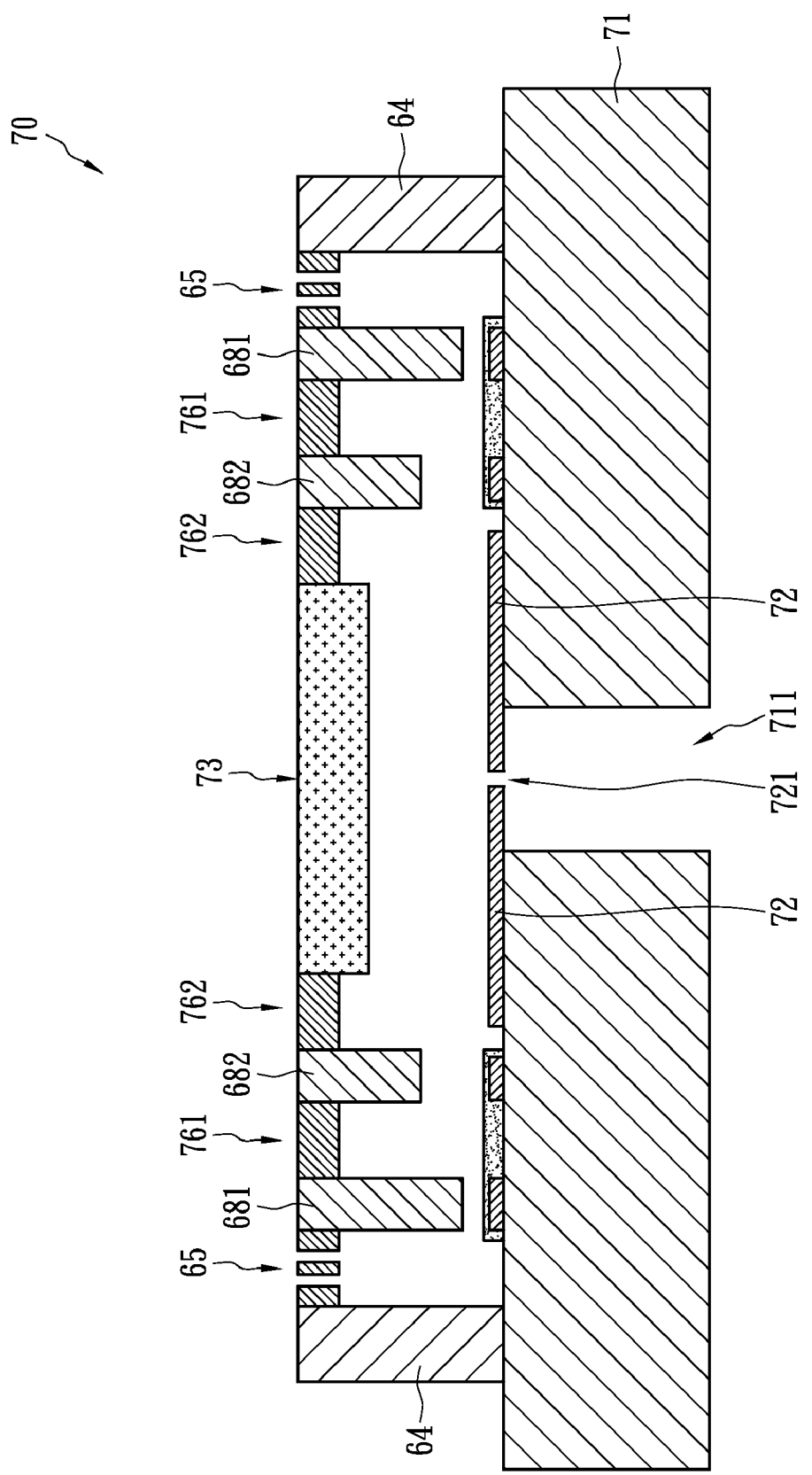
FIG. 7B shows a perspective cross-sectional diagram taken along line 7-7 in FIG. 7A.

FIG. 7A shows a top view diagram of a capacitive sensor in accordance with another embodiment, and FIG. 7B shows a perspective cross-sectional diagram taken along line 7-7 in FIG. 7A. The capacitive sensor 70 can be applied to a pressure gauge. That is, the sensing device 73 can reflect pressure changes in a vertical displacement manner. When the vertical displacement results in a change in the inner volume, air passes inward or outward through the opening 711 of the substrate 71 and the opening 721 of the first electrode 72. The inner second spring member 762 and the middle third spring member 761 of the embodiment are continuous elastomers.

Figure 8A:
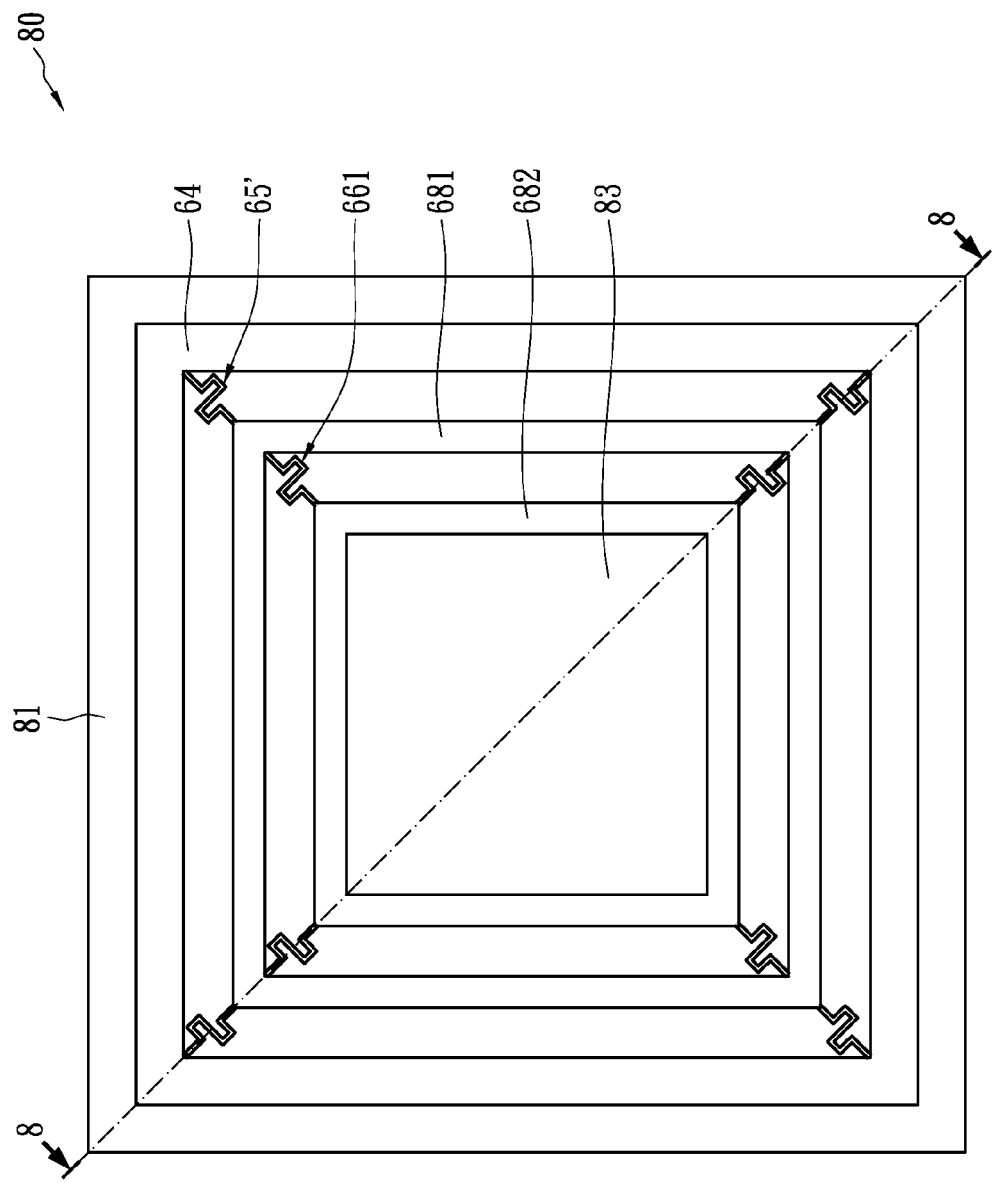
FIG. 8A shows a top view diagram of a capacitive sensor in accordance with another embodiment.
Figure 8B:
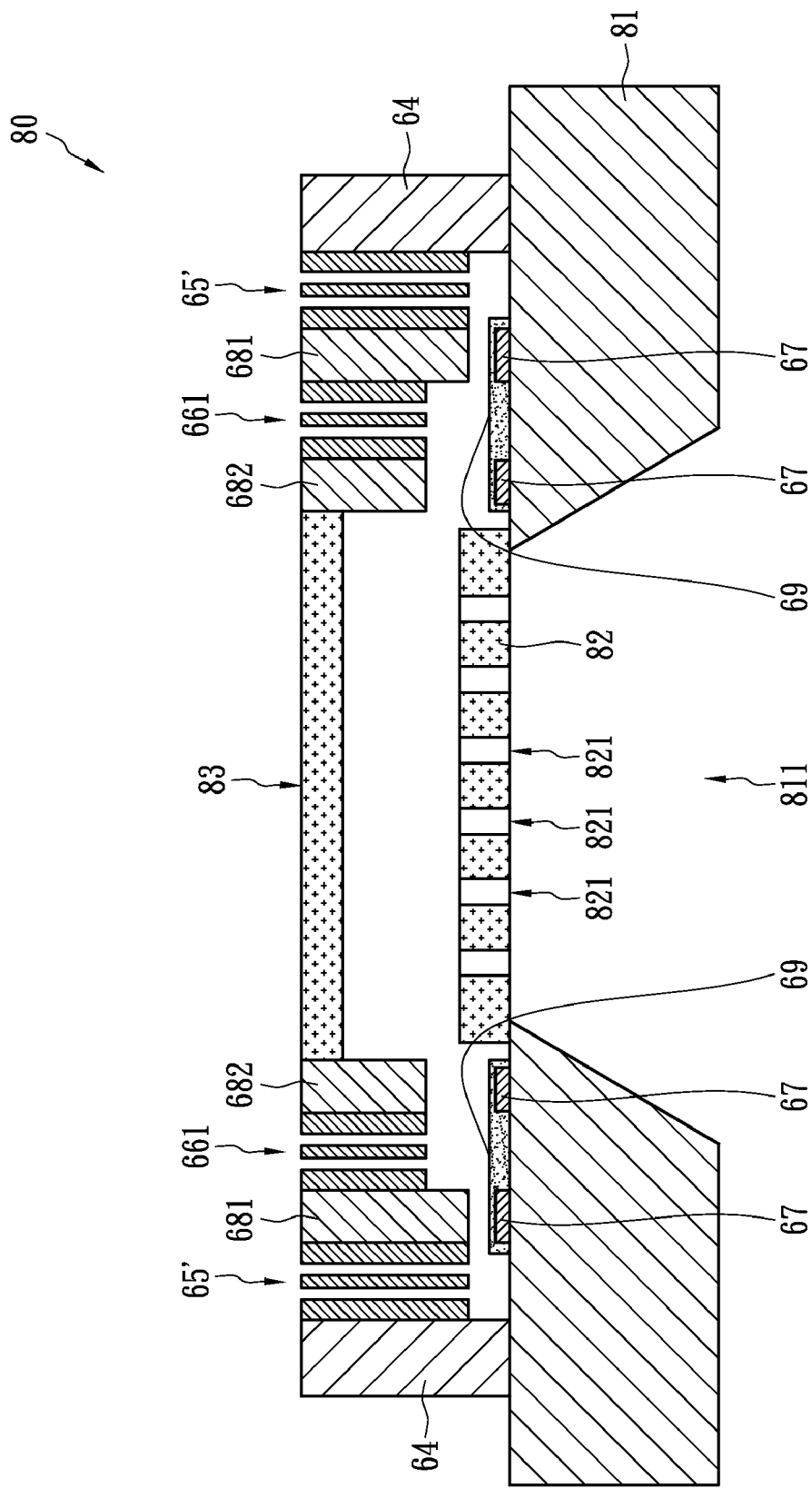
FIG. 8B shows a perspective cross-sectional diagram taken along line 8-8 in FIG. 8A.

FIG. 8A shows a top view diagram of a capacitive sensor in accordance with another embodiment, and FIG. 8B shows a perspective cross-sectional diagram taken along line 8-8 in FIG. 8A. The capacitive sensor 80 can be applied to a microphone. That is, the sensing device 83 is a conductive membrane, and can reflect acoustic waves in an instant vertical displacement, so air passes inward or outward through the taper opening 811 of the substrate 81 and the openings 821 (sound holes) of the first electrode 82. In the embodiment, the sensing device 83 is directly connected to the second movable frame 682, or is connected to the second movable frame 682 through a plurality of second spring members (not shown).

Figure 9A:
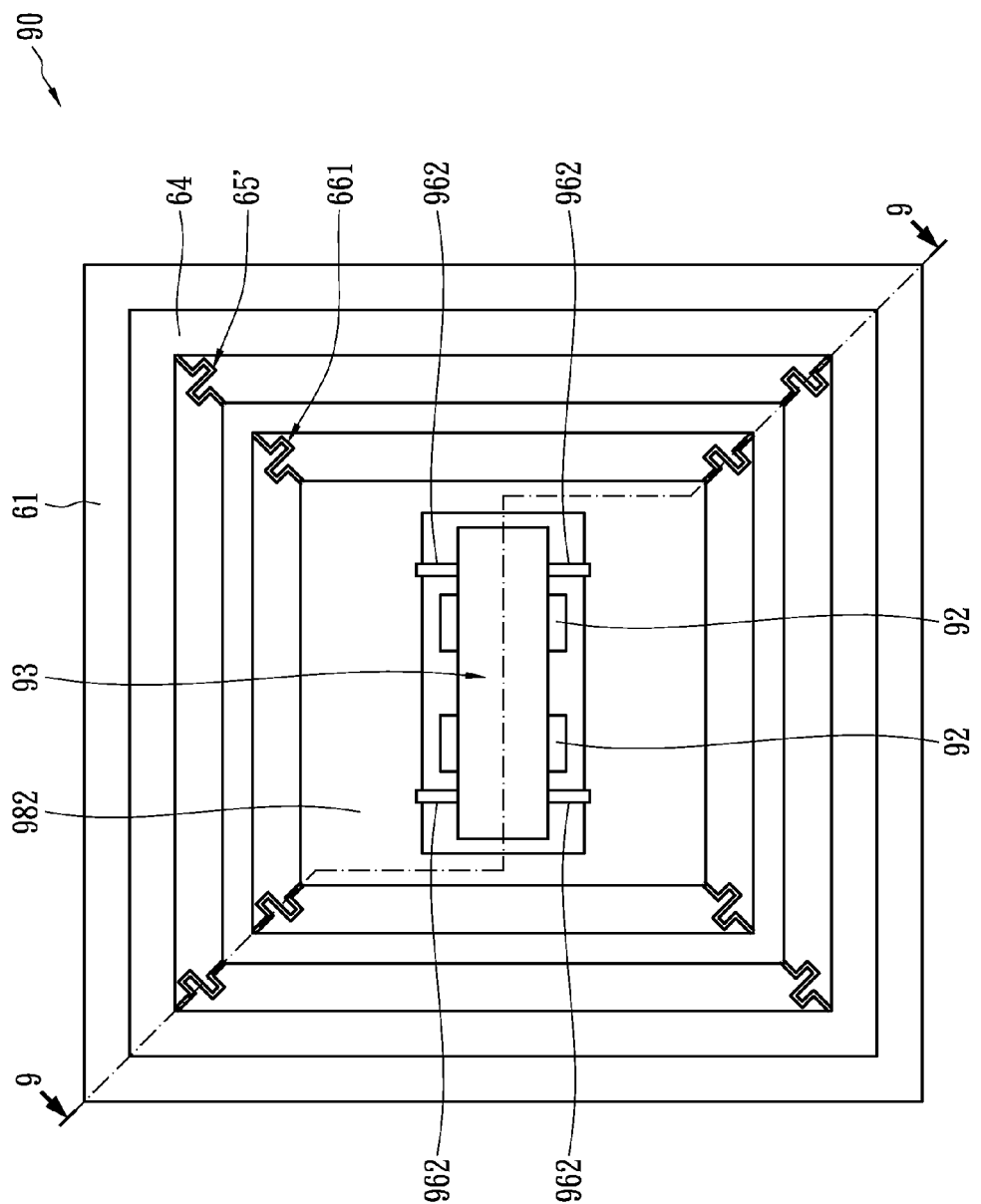
FIG. 9A shows a top view diagram of a capacitive sensor in accordance with another embodiment.
Figure 9B:
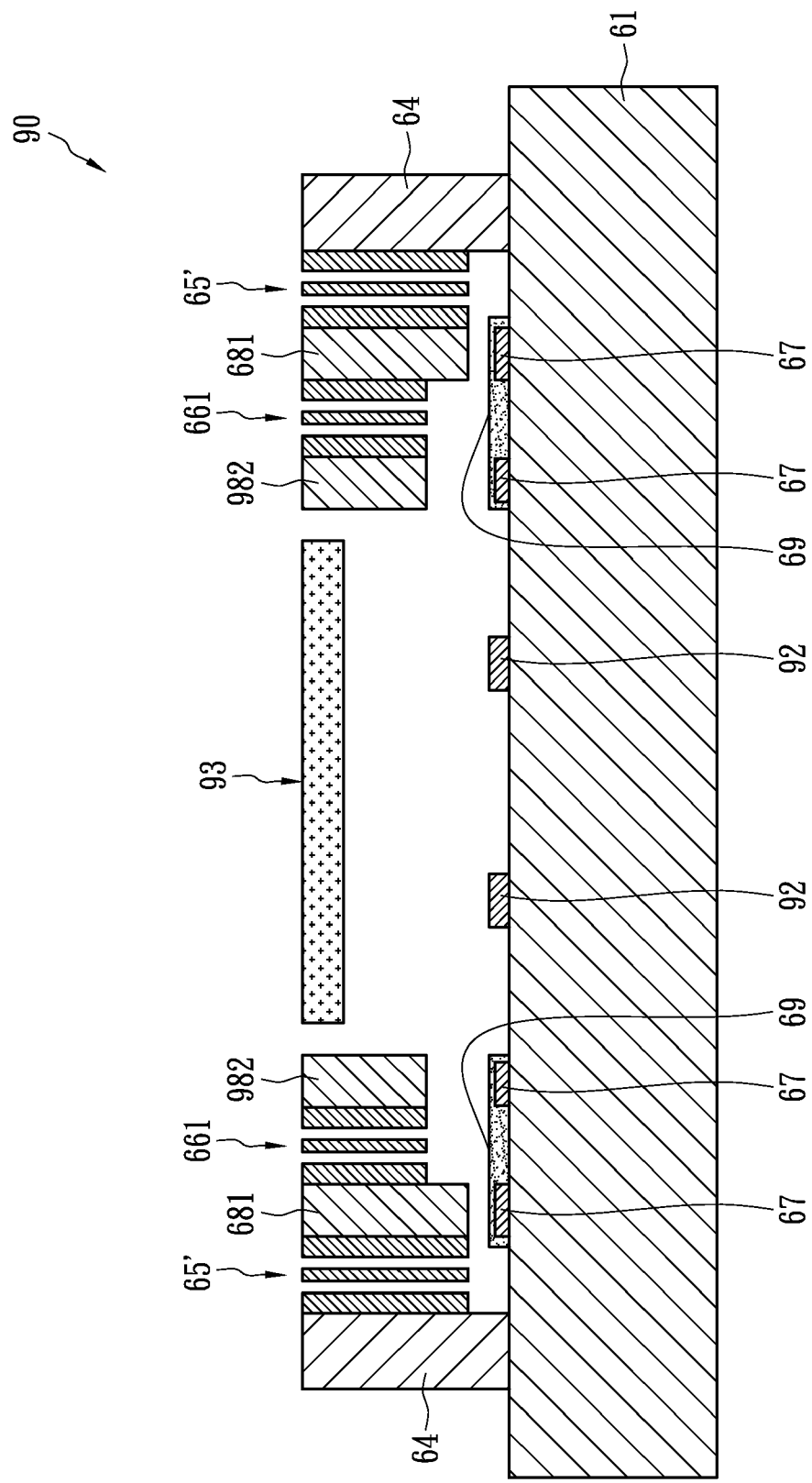
FIG. 9B shows a perspective cross-sectional diagram taken along line 9-9 in FIG. 9A.

FIG. 9A shows a top view diagram of a capacitive sensor in accordance with another embodiment, and FIG. 9B shows a perspective cross-sectional diagram taken along line 9-9 in FIG. 9A. The capacitive sensor 90 can be applied to a resonator. That is, the sensing device 93 can reflect voltage changes in a resonant vibration manner. The sensing device 93 is connected to the second movable frame 982 by spring members 962, and is driven by a plurality of first electrodes 92 under it to vibrate.

Figure 10A:
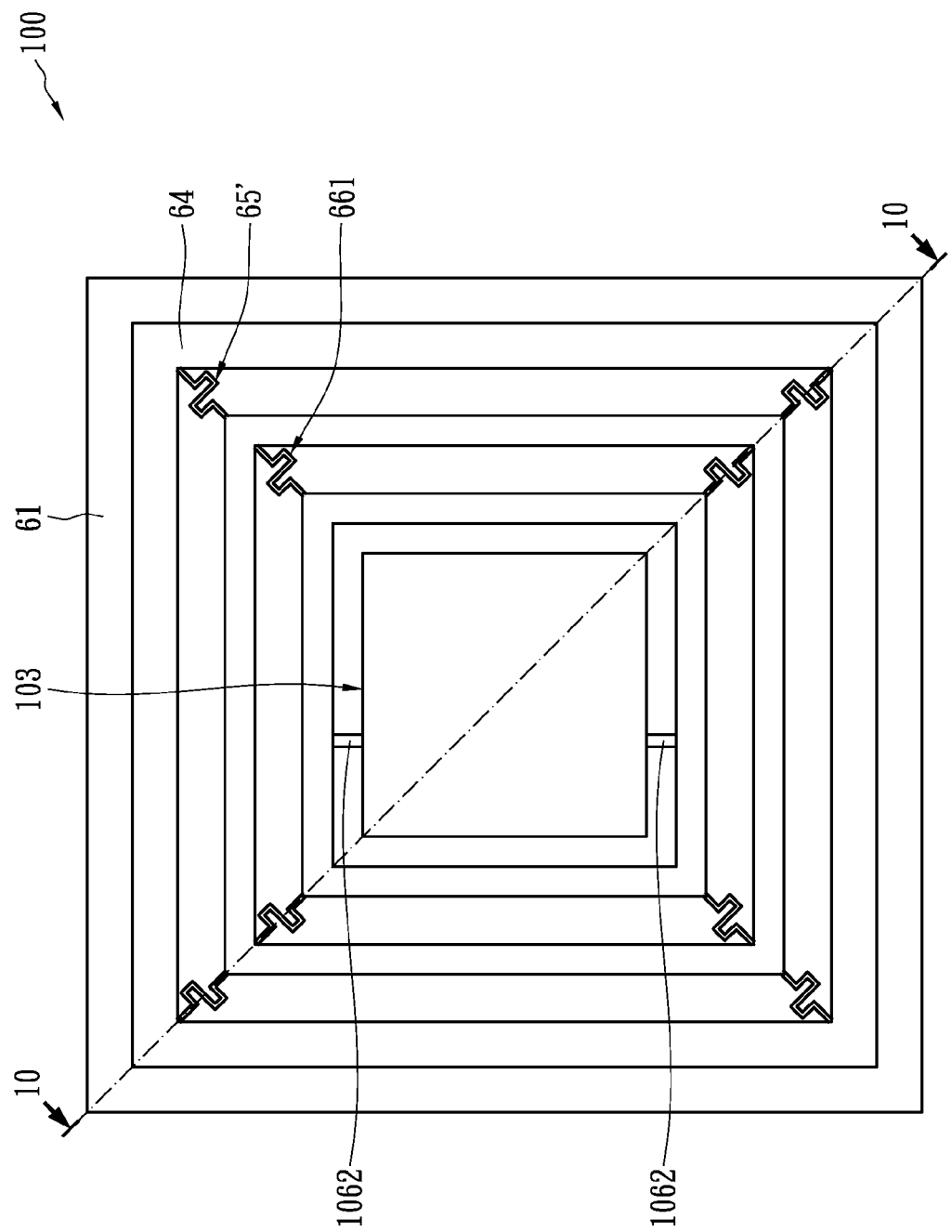
FIG. 10A shows a top view diagram of a capacitive sensor in accordance with another embodiment.
Figure 10B:
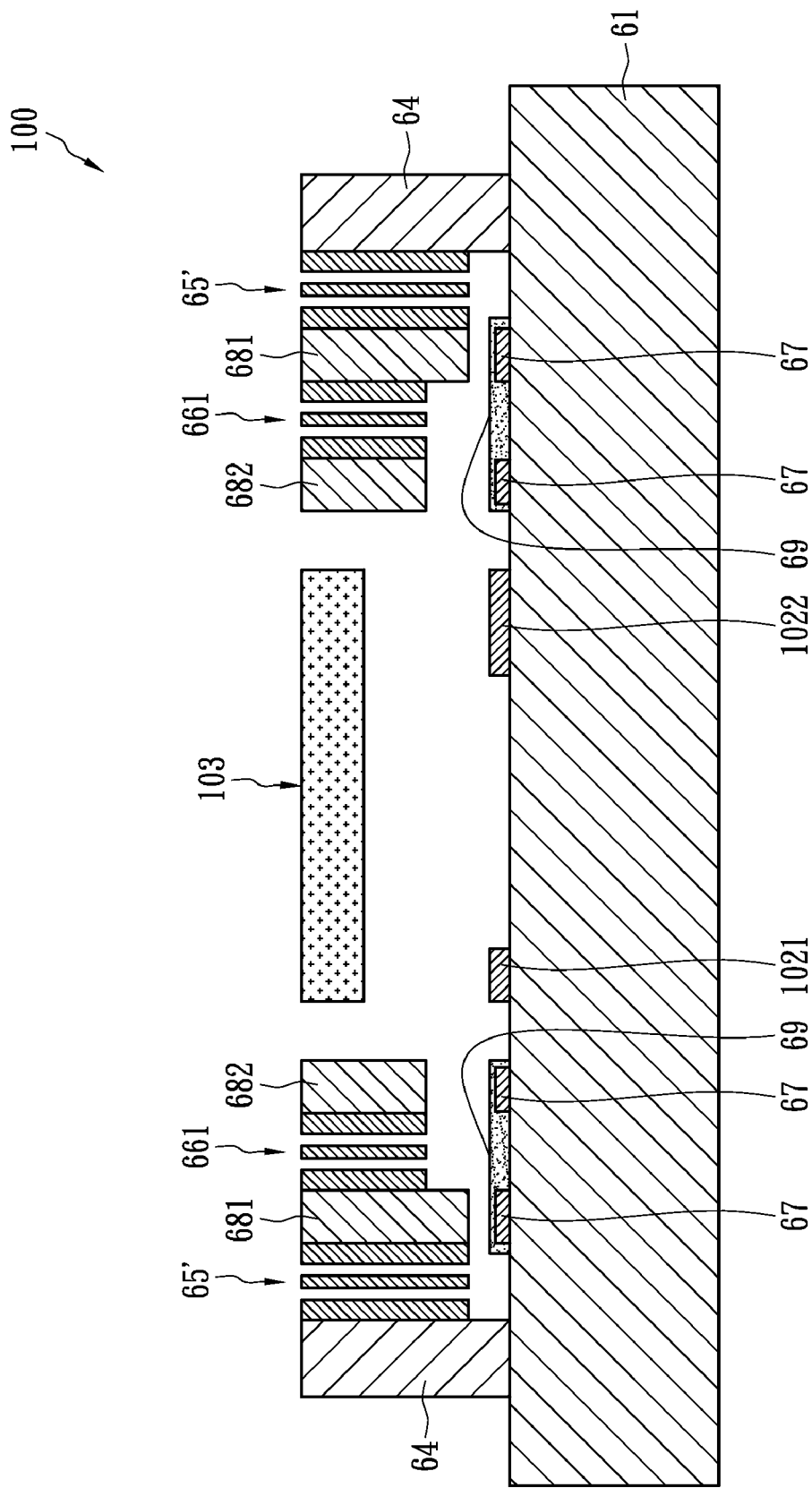
FIG. 10B shows a perspective cross-sectional diagram taken along line 10-10 in FIG. 10A.

FIG. 10A shows a top view diagram of a capacitive sensor in accordance with another embodiment, and FIG. 10B shows a perspective cross-sectional diagram taken along line 10-10 in FIG. 10A. The capacitive sensor 100 can be applied to an accelerator. That is, the sensing device 103 is a conductive mass lump, and can reflect acceleration in a direction vertical to the surface of the substrate 61 by a rotation around the pivot of the torsion spring members (second spring members) 1062. Because the axial lines of the two torsion spring members 1062 are not aligned with the center of mass of the sensing device 103, the aforesaid acceleration can induce the rotation of the sensing device 103. The magnitude of the rotation can be detected by capacitance change between sensing device 103 and the first electrodes 1021 and 1022.

Figure 11A:
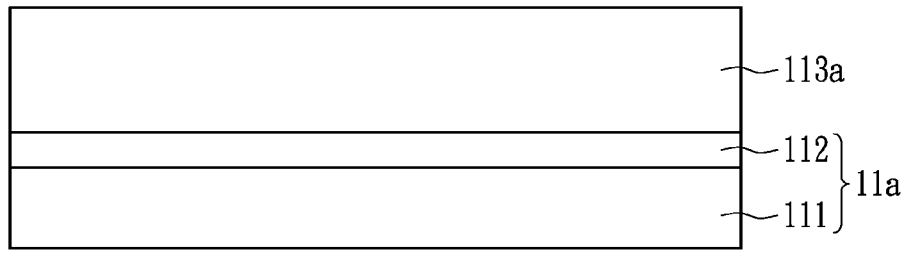
FIGS. 11A to 13C show manufacturing steps of a capacitive sensor in accordance with one embodiment.
Figure 11B:
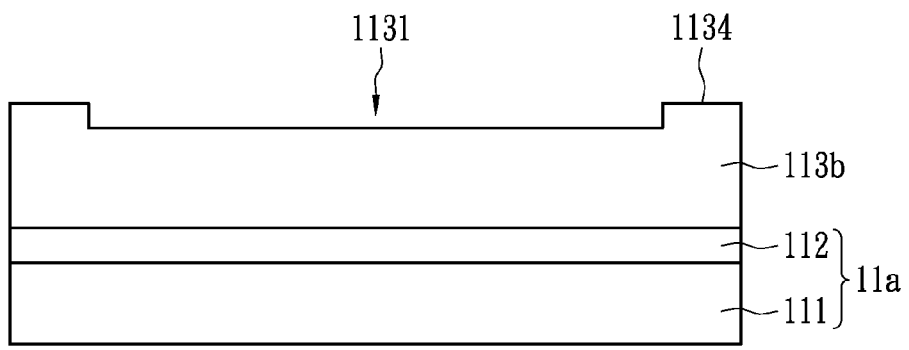
Figure 11C:
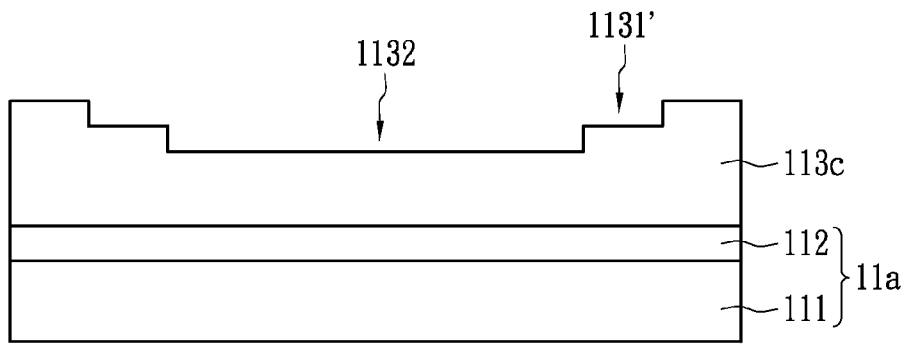
Figure 11D:
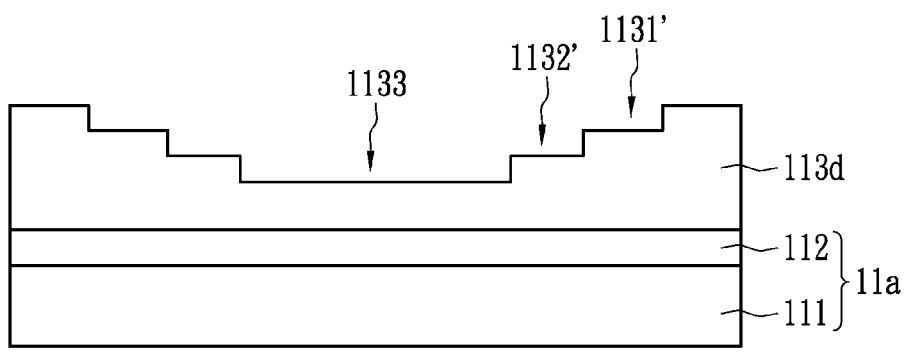

FIGS. 11A to 11D show manufacturing steps of a capacitive sensor in accordance with one embodiment. As shown in FIG. 11A, a first substrate 11a is provided, and includes an insulating layer 112 and a silicon layer 111. A base layer 113a is formed on the insulating layer 112. The combination of the first substrate 11a and the base layer 113a can be, but is not limited to, an SOI (silicon on insulator) wafer. The material of the base layer 113a can be silicon material. The surface of the base layer 113a is patterned to obtain a base layer 113b having a first cavity 1131 and an unetched portion 1134 by an wet etching process (such as KOH etching process), as shown in FIG. 11B. Thereafter, the bottom of the first cavity 1131 is patterned to form a base layer 113c having a second cavity 1132 and a first cavity 1131' by an wet etching process (such as KOH etching process), as shown in FIG. 11C. Similarly, the bottom of the second cavity 1132 is patterned to form a base layer 113d having a third cavity 1133, a second cavity 1132' and the first cavity 1131' by an wet etching process (such as KOH etching process), as shown in FIG. 11D. The depth of the first cavity 1131' can be defined as the distance from unetched portion 1134 to the bottom of the first cavity 1131'. The depth of the second cavity 1132' can be defined as the distance from unetched portion 1134 to the bottom of the second cavity 1132'. The depth of the third cavity 1133 can be defined as the distance from unetched portion 1134 to the bottom of the third cavity 1133.

Figure 12A:
Figure 12B:
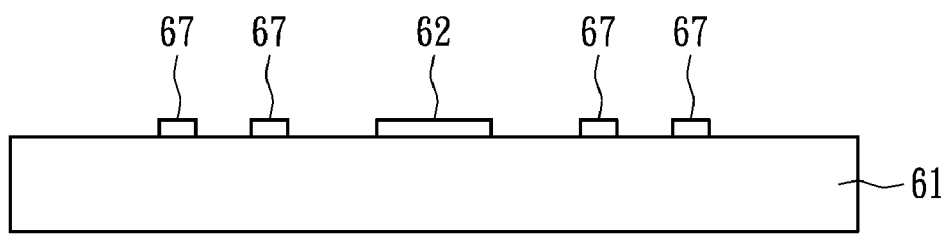
Figure 12C:
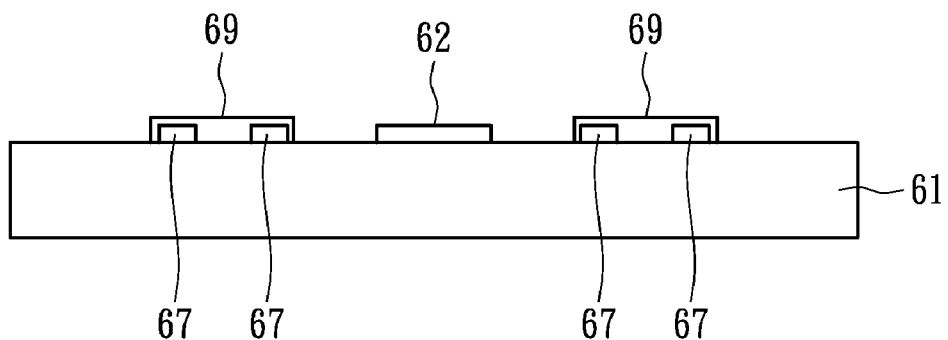

FIGS. 12A to 12C show manufacturing steps of a capacitive sensor in accordance with one embodiment. As shown in FIG. 12A, a second substrate 61 is provided, and is a silicon substrate or a glass substrate. A first electrode 62 and a plurality of second electrodes 67 are formed on the surface of the second substrate 61, as shown in FIG. 12B. The first electrode 62 and the second electrodes 67 can be formed on the second substrate 61 by an metal deposition process. The second electrodes 67 are covered with an insulating layer 69 for electrically insulating them from each other, as shown in FIG. 12C.

Figure 13A:
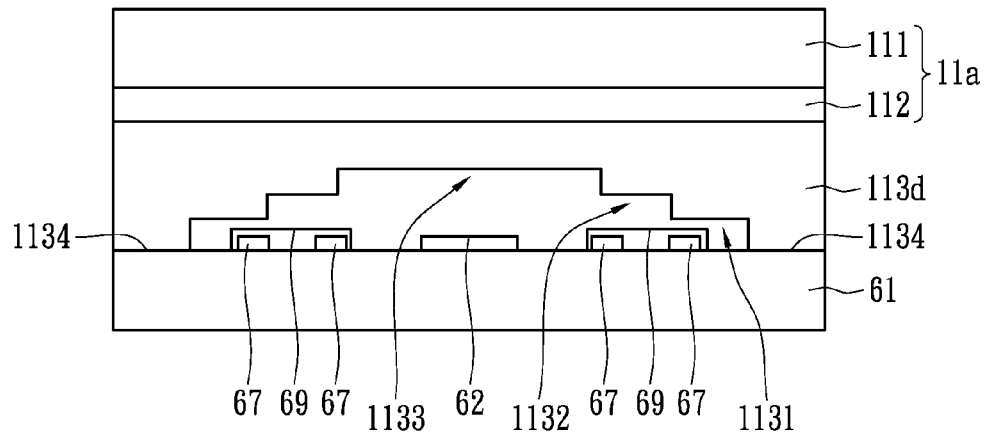
Figure 13B:
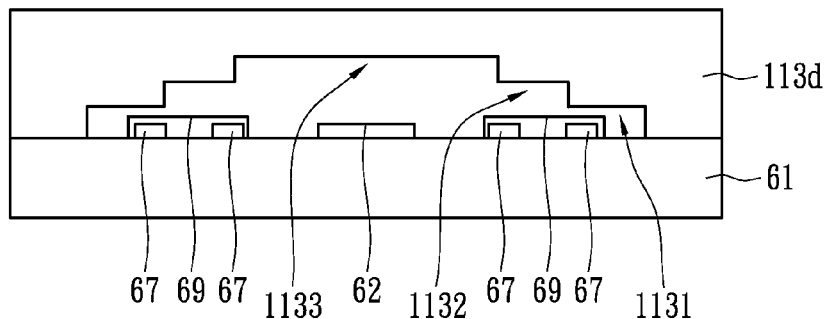
Figure 13C:
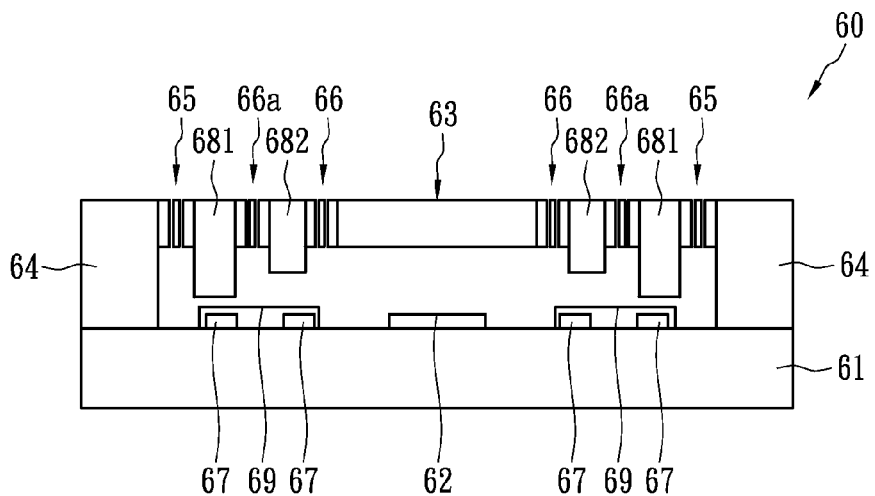

FIGS. 13A to 13C show manufacturing steps of a capacitive sensor in accordance with one embodiment. As shown in FIG. 13A, the base layer 113d combined with the first substrate 11a faces the second substrate 61, and is disposed on the second substrate 61. The unetched portion 1134 of the base layer 113d is bonded to the second substrate 61. This embodiment merely shows the manufacturing processes of a capacitive sensor. Such a combination uses the wafer-to-wafer bonding process, and hence, a plurality of capacitive sensors can be simultaneously fabricated during the same processes. The unetched portion 1134 is mounted to the surface of the second substrate 61 by a bonding layer (not shown).

As shown in FIG. 13B, the first substrate 11a is removed from the surface of the base layer 113d. In this embodiment, silicon the layer 111 is removed by wet etching process such as KOH etching process or removed by wafer grounding process and wet etching process such as KOH etching process sequentially. The insulating layer 112 is removed by wet etching process such as HF etching process. Thereafter, the base layer 113d is etched by DRIE (Deep Reactive Ion Etch) etching process at least once to form a sensing device 63, at least one movable frame (681, 682), a plurality of first spring members 65, a plurality of second spring members 66, and at least one anchor base 64, as shown in FIG. 13C. Consequently, the capacitive sensor 60 is completed by the aforesaid steps.

The disclosure utilizes simple MEMS processes to complete the fabrication of the capacitive sensor. The process windows (tolerance control) of the present manufacturing processes are larger than those of the manufacturing processes of the conventional capacitive sensor. The plurality of spring members provide forces for position return through vertical elastic deformation. Because the elastic coefficient of the plurality of spring members is small, the sensitivity of the movement of the sensing device is not affected. Furthermore, the driving voltage of the capacitive sensor is reduced. The clearance between the electrodes of the capacitor is enlarged and different processes are used, so the problems of electrode stiction are resolved.

The above-described embodiments are intended to be illustrative only. Numerous alternative embodiments may be devised by those skilled in the art without departing from the scope of the following claims.

We claim:

1. A capacitive sensor, comprising:
   a substrate;
   a plurality of electrodes, including:
     at least one first electrode and at least one second electrode respectively disposed on the substrate, wherein the second electrode surrounds the first electrode;
   at least one anchor base disposed on the substrate and around the electrodes;
   a sensing device disposed above the first electrode;
   at least one movable frame surrounding the sensing device and disposed above the second electrode; and
   a plurality of spring members, including:
     a plurality of first spring members connecting the anchor base and the movable frame;
     a plurality of second spring members connecting the sensing device and the movable frame.

2. The capacitive sensor of claim 1, wherein the plurality of spring members further include a plurality of third spring members, the at least one movable frame includes a first movable frame and a second movable frame, and the first movable frame and the second movable frame are connected by the third spring members.

3. The capacitive sensor of claim 1, wherein the thickness of the movable frame is smaller than the thickness of the anchor bases, and is greater than the thickness of the sensing device.

4. The capacitive sensor of claim 2, wherein the thickness of the first movable frame adjacent to the anchor base is greater than the thickness of the second movable frame adjacent to the sensing device.

5. The capacitive sensor of claim 1, wherein the clearance between the movable frame and the substrate is smaller than the clearance between the sensing device and the substrate.

6. The capacitive sensor of claim 1, wherein each of the first spring members includes a first connecting segment, a first suspension segment, a transition segment, a second suspension segment and a second connecting segment sequentially connected.

7. The capacitive sensor of claim 6, wherein the transition segment connects one end of the first suspension segment and one end of the second suspension segment along a radial direction.

8. The capacitive sensor of claim 7, wherein the sensing device is circular, and the first suspension segment and the second suspension segment are cantilever beams respectively with the same arc angle and different radiuses.

9. The capacitive sensor of claim 1, wherein the substrate includes an opening and the first electrode includes a plurality of holes.

10. The capacitive sensor of claim 1, wherein the substrate includes an opening, the first electrode includes a hole, and the sensing device senses changes in pressure.

11. The capacitive sensor of claim 2, wherein the second spring members and the third spring members are continuous elastomers.

12. The capacitive sensor of claim 1, wherein the thicknesses of the spring members are different.

13. The capacitive sensor of claim 1, wherein the second spring members are provided at positions asymmetric to the center of mass of the sensing device, and connect the sensing device.

14. The capacitive sensor of claim 1, further comprising an insulating layer covering the second electrodes.

15. The capacitive sensor of claim 1, further comprising an insulating layer interposed between the substrate and the electrodes.

16. The capacitive sensor of claim 1, wherein the substrate includes a silicon layer, a plurality of conductive layers, a plurality of insulating layers and at least one circuit area.

17. A method for manufacturing a capacitive sensor, comprising:
providing a first wafer-based substrate having a surface on which a base layer is disposed;
etching the base layer to form a plurality of cavities sequentially, wherein the depths of the cavities are different;
providing a second wafer-based substrate on which a first electrode and a second electrode are disposed;
bonding the unetched surface of the base layer to the second substrate; removing the first substrate; and
etching the base layer to form a sensing device, at least one movable frame, a plurality of spring members, and at least one anchor base, wherein the anchor base surrounds the first and second electrodes and is disposed on the second substrate, the movable frame surrounds the sensing device, some of the spring members connect the movable frame and the sensing device, and the other spring members connect the movable frame and the anchor base.

18. The method for manufacturing a capacitive sensor of claim 17, wherein the first substrate includes a silicon layer and an insulating layer.

19. The method for manufacturing a capacitive sensor of claim 17, further comprising a step of overlaying an insulating layer on the second electrode after the step of providing the first substrate.

20. The method for manufacturing a capacitive sensor of claim 17, wherein the unetched surface of the base layer is bonded to the second substrate by a bonding layer.

21. The method for manufacturing a capacitive sensor of claim 18, wherein the combination of the first substrate and the base layer is an SOI wafer.

22. The method for manufacturing a capacitive sensor of claim 17, wherein the cavities include a first cavity, a second cavity, and a third cavity, and the depths of the first cavity, the second cavity and the third cavity measured from the unetched surface of the base layer are gradually increased.

23. The method for manufacturing a capacitive sensor of claim 17, further comprising a step of forming an opening on the second substrate after the step of providing the second substrate.

24. The method for manufacturing a capacitive sensor of claim 23, further comprising a step of forming at least one hole on the first electrode after the step of forming the opening on the second substrate.

* * * * *